(12) United States Patent
Ohshima et al.

(10) Patent No.: US 7,580,181 B2
(45) Date of Patent: Aug. 25, 2009

(54) DISPLAY

(75) Inventors: Tetsuya Ohshima, Mobara (JP); Tatsuya Sugita, Takahagi (JP)

(73) Assignee: Hitachi, Ltd., Tokyo (JP)

( * ) Notice: Subject to any disclaimer, the term of this patent is extended or adjusted under 35 U.S.C. 154(b) by 238 days.

(21) Appl. No.: 11/624,741

(22) Filed: Jan. 19, 2007

(65) Prior Publication Data

US 2007/0211330 A1 Sep. 13, 2007

(30) Foreign Application Priority Data

Mar. 7, 2006 (JP) .............................. 2006-060427

(51) Int. Cl.
G02B 26/00 (2006.01)

(52) U.S. Cl. ..................................... 359/296
(58) Field of Classification Search ................. 359/296; 345/105, 108, 49; 430/32, 34, 38; 204/450, 204/600

See application file for complete search history.

(56) References Cited

U.S. PATENT DOCUMENTS

| | | | |
|---|---|---|---|
| 7,371,624 B2 * | 5/2008 | Eguchi et al. ................ | 438/155 |
| 7,411,344 B2 * | 8/2008 | Yamazaki et al. ........... | 313/506 |
| 2004/0135763 A1 | 7/2004 | Kaneko et al. | |
| 2004/0184137 A1 | 9/2004 | Kaneko et al. | |
| 2005/0012709 A1 | 1/2005 | Ohshima et al. | |
| 2007/0076289 A1 * | 4/2007 | Wang et al. .................. | 359/296 |
| 2007/0187761 A1 * | 8/2007 | Hamada et al. .............. | 257/351 |

FOREIGN PATENT DOCUMENTS

| | | |
|---|---|---|
| JP | 2003-005225 | 1/2003 |
| JP | 2004-163703 | 6/2004 |
| JP | 2004-286836 | 10/2004 |
| JP | 2005-031405 | 2/2005 |

\* cited by examiner

*Primary Examiner*—Scott J Sugarman
*Assistant Examiner*—Tuyen Q Tra
(74) *Attorney, Agent, or Firm*—Antonelli, Terry, Stout & Kraus, LLP.

(57) ABSTRACT

A display that has a plurality of charged particles between a pair of substrates and displays images by moving the plurality of charged particles. The display comprises one substrate formed with a pixel electrode; the other substrate that is disposed to face the one surface and is formed with a counter electrode; a plurality of partitions for dividing the gap between the pair of substrates into a plurality of regions; and an insulating layer formed to have an insulating part and openings on the pixel electrode, and displays images by changing the potential difference applied between the pixel electrode and the counter electrode.

28 Claims, 19 Drawing Sheets

DISPLAY

BACKGROUND OF THE INVENTION

The present invention relates to an electrophoretic display and a particle moving type display.

Conventionally, a display has been disclosed in, for example, a Japanese Laid-open Patent Application JP-A-2003-5225, in which colored charged particles are dispersed in an transparent medium, the particles are moved and thereby reflectivity is changed by means, which are disposed in a two-dimensional array, for controlling voltage to be applied to each pixel, and thus images are displayed.

In this display, a transparent medium containing colored charged particles dispersed therein is filled between a pair of substrates, voltage is varied that is applied between an electrode that is formed on a central part of a pixel of a lower substrate of the pair of substrates and an electrode that is formed in a stage part disposed on the lower substrate, and switching is carried out between a particle color and a background color for each pixel by the motion of the colored charged particles, thus images being displayed. When the colored charged particles are attracted onto the electrode that is formed in the stage part, the display exhibits a first color possessed by the colored charged particles. In addition, when the colored charged particles are moved onto the electrode that is formed in the stage, the display exhibits a second color possessed by the electrode formed in the stage part.

In such a display, when the colored charged particles are moved to the electrode formed on the stage part while the above first color (particle color) is exhibited, the electrode formed in the center of the pixel is exposed to produce different reflected light, thus causing a decrease in contrast ratio. To prevent this, a countermeasure may be taken such as coloring the electrode formed in the center of the pixel into the particle color. However, there arise problems such as deterioration in optical characteristics due to the difference in color as compared with the particle color, deterioration in electrical characteristics due to the colored layer, and an increase in cost. In addition, the above display is structured such that when changing images, particles are moved from the electrode formed in the stage part to the side opposite to the electrode formed in the center of the pixel. Therefore, the operation of changing the voltage of the electrode formed at the center of the pixel is weakened by the shield effect of the electrode itself that is formed in the stage part, and the particles that fail to move remain there. Thus, satisfactory reflectivity, contrast ratio, and response speed are not necessarily obtained.

SUMMARY OF THE INVENTION

It is an object of the present invention to provide a display that solves these problems, achieves a high reflectivity as well as a high contrast, and reduces response time.

In order to solve the above problems, the present invention provides the display that has a plurality of charged particles between a pair of substrate. The display comprises one substrate of the pair of substrates that is formed with a pixel substrate; the other substrate that is disposed to face the one substrate and is formed with a counter electrode; and an insulating layer that has an insulating part and an opening on the pixel electrode, and displays images by changing the potential difference that is applied between the pixel electrode and the counter electrode.

Furthermore, the display has a plurality of charged particles between a pair of substrate, and comprises one substrate of the pair of substrates that is formed with a pixel substrate; the other substrate that is disposed to face the one substrate and is formed with a counter electrode; a plurality of partitions for dividing the gap between the one substrate and the other substrate into a plurality of regions; and an insulating layer that has an insulating part and an opening on the pixel electrode, and displays images by switching between a state where particles dispersed in the opening are converged in the opening and a state where particles dispersed in the gap are dispersed to the counter electrode.

In addition, the display has a plurality of charged particles between a pair of substrate, and comprises one substrate of the pair of substrates that is formed with a pixel substrate; the other substrate that is disposed to face the one substrate and is formed with a counter electrode; a plurality of partitions for dividing the gap between the one substrate and the other substrate into a plurality of regions; and an insulating layer that has an insulating part and an opening on the pixel electrode, and displays images by switching between a state where particles dispersed in the opening are converged in the insulating layer and a state where particles dispersed in the gap are dispersed to the counter electrode.

Moreover, the display has a plurality of charged particles between a pair of substrate, and comprises the other substrate that is disposed to face one substrate of the pair of substrate and is formed with a counter electrode; a plurality of partitions for dividing the gap between the one substrate and the other substrate into a plurality of regions; an uneven layer having an uneven shape disposed on the one substrate; a pixel electrode formed on the uneven layer; and an insulating layer that has an insulating part and an opening on the pixel electrode, and displays images by changing the potential difference that is applied between the pixel electrode and the counter electrode.

Furthermore, the display has a plurality of charged particles between a pair of substrate, and comprises the other substrate that is disposed to face the one substrate of the pair of substrates and is formed with a counter electrode; a plurality of partitions for dividing the gap between the one substrate and the other substrate into a plurality of regions; an uneven layer having an uneven shape disposed on the one substrate; a pixel electrode formed on the uneven layer; and an insulating layer that has an insulating part and an opening on the pixel electrode, and displays images by switching between a state where particles dispersed in the opening are converged in the insulating layer and a state where particles dispersed in the gap are dispersed to the counter electrode.

In addition, the pixel electrode and counter electrode are configured to be formed throughout the region.

The present invention is able to achieve a high quality display that has a high reflectivity as well as a high contrast ratio, and shortens the response time.

Other objects, features and advantages of the invention will become apparent from the following description of the embodiments of the invention taken in conjunction with the accompanying drawings.

DESCRIPTION OF THE EMBODIMENTS

Figure 1A:
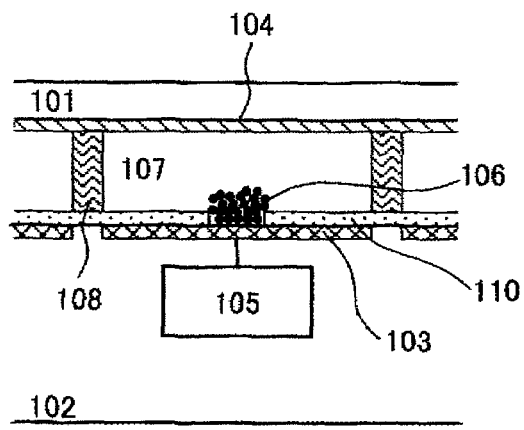
FIGS. 1A and 1B are diagrams showing an embodiment of a cross-sectional structure of a display according to the present invention.
Figure 1B:
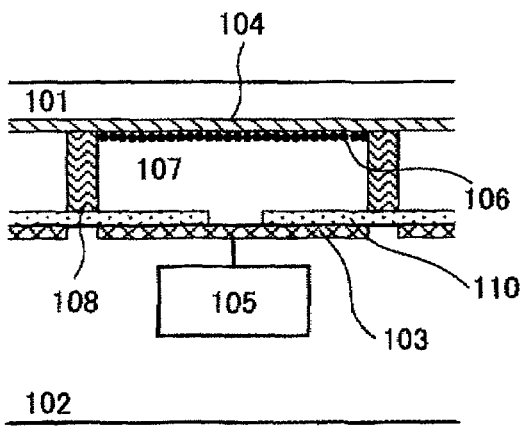

FIGS. 1A and 1B show a schematic diagram of a display according to the present invention, in which a plurality of charged particles 106 are contained in a medium that is filled between a pair of substrates, and images are displayed by the motion of the plurality of charged particles 106.

The display is provided with partitions 108 for dividing the gap between a substrate 102, one substrate of the pair of substrates, and a substrate 101, the other substrate opposing the one substrate, into a plurality of regions. Each one of the plurality of regions is a pixel. The pixel is provided with a pixel electrode 103, which is two-dimensionally disposed on the substrate 102. Furthermore, a particle driving means 105 is provided that applies voltage to the pixel electrode 103. Each pixel is partitioned by the partitions 108, and the transparent substrate 101 that is disposed to face the substrate 102 is provided with a counter electrode 104. The pixel electrode 103 and the counter electrode 104 are disposed across the entire region (within the pixels) at the very least. In the present embodiment, the counter electrode 104 is formed across the entire surface of the substrate 101.

A transparent medium 107 and colored charged particles 106 are filled between the substrates 101 and 102. The potential difference applied between the pixel electrode 103 and the counter electrode 104 is changed by the operation of the particle driving means 105, and thereby images are displayed. More specifically, the colored charged particles 106, which are colored for each pixel, are moved by changing the potential difference, and reflectivity is modulated, thus images being displayed. The particle driving means 105 has a function to change the potential difference applied between the pixel electrode 103 and the counter electrode 104. In other words, the particle driving means 105 has a function to change between a state where the particles dispersed in the gap between the pair of substrates are converged to an opening of the insulating layer 110 and a state where the particles are dispersed to the counter electrode 104. Here, when the counter electrode 104 is at a certain potential, and the voltage applied to the pixel electrode 103 is changed to a positive voltage or a negative voltage with respect to the counter electrode 104 by the operation of the particle driving means 105, the colored charged particles move to the counter electrode 104 or to the pixel electrode 103.

When the colored charged particles are moved to the pixel electrode 103 which has an insulating layer having an insulating portion as well as an opening thereon as shown in FIG. 1A, the charged particles are converged in proximity to the opening which serves substantially as an electrode to exhibit the colors of the pixel electrode 103 and the insulating layer 110. Here, if the pixel electrode 103 and insulating layer 110 have a high reflectivity in the entire visible region, white is exhibited. When the charged particles are moved to the counter electrode 104 as shown in FIG. 1B, the colored charged particles 106 are dispersed to the counter electrode 104, or the colored charged particles 106 cover the entire pixel surface to exhibit the color of the particles. If, for example, the colored charged particles 106 have a high absorption rate in the entire visible region, light is absorbed and thereby black is exhibited.

In the present invention, since the charged particles cover the entire internal surface of the pixel while the particle color is exhibited (FIG. 1B), a high contrast ratio is obtained. Moreover, since the charged particles are moved between the pixel electrode 103 and the counter electrode 104, an electric field is not excessively weakened at the end of the counter electrode 104, or in the vicinity of the partitions. Therefore, no charged particles remain, thus making it possible to obtain a high reflectivity, a high contrast ratio, and a high response speed.

Figure 2A:
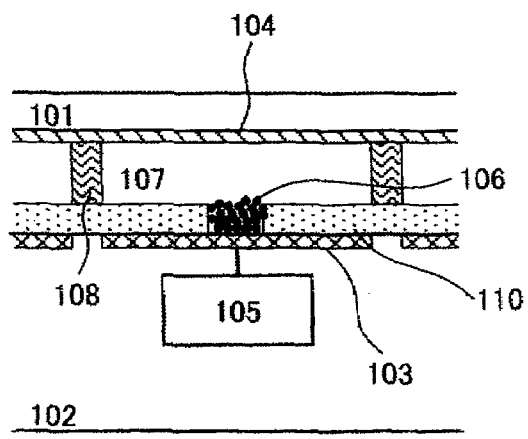
FIGS. 2A and 2B are diagrams showing another embodiment of a cross-sectional structure of a display according to the present invention.
Figure 2B:
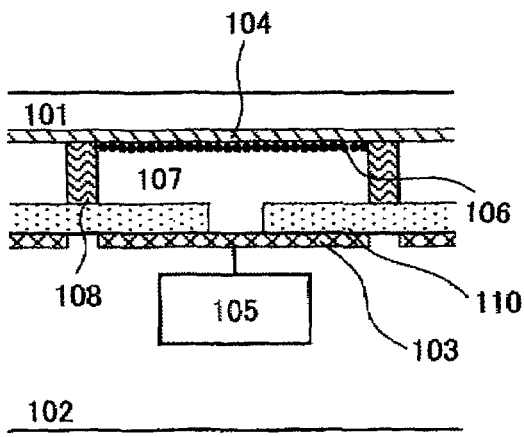

In the pixel structure shown in FIGS. 1A and 1B, when the charged particles are converged in the opening as shown in FIG. 1A, sometimes all the charged particles are not converged in the opening of the insulating layer, with some being exuded, thus resulting in a substantial reduction in aperture ratio, reflectivity, and contrast ratio. In order to solve the problems, it is preferable that the thickness of the insulating layer 110 be increased to approximately 0.5 to 3 μm, several times the charged particle or more as shown in FIGS. 2A and 2B. This enables the charged particles to be converged in the opening of the insulating layer during the convergence of the charged particles, and reduces the particles leaking out from the opening to the periphery of the opening, thus making it possible to enhance the reflectivity as well as contrast ratio.

Figure 3A:
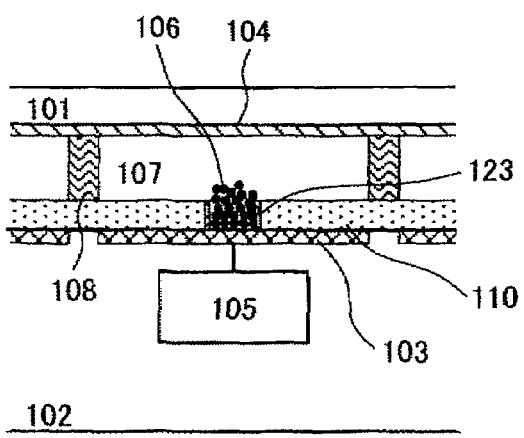
FIGS. 3A and 3B are diagrams showing another embodiment of a cross-sectional structure of a display according to the present invention.
Figure 3B:
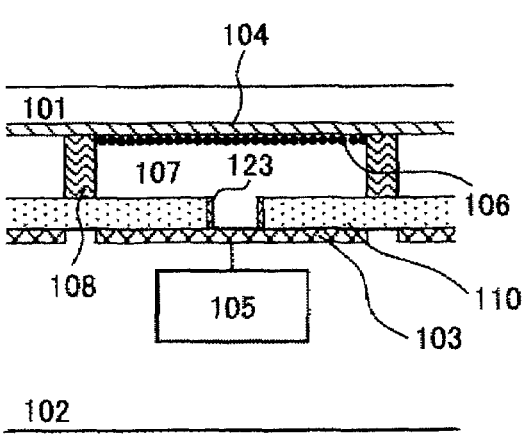
Figure 4A:
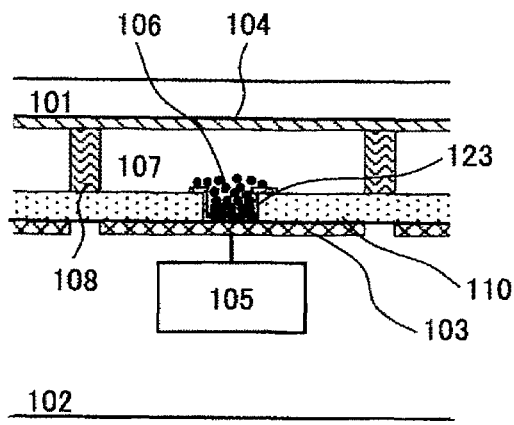
FIGS. 4A and 4B are diagrams showing another embodiment of a cross-sectional structure of a display according to the present invention.
Figure 4B:
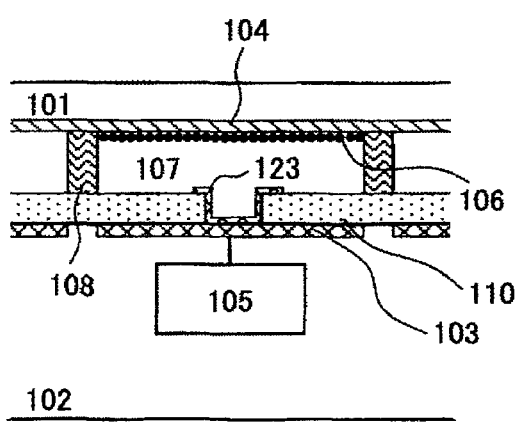

Furthermore, it is preferable that an electrode 123 be provided on the side of the insulating layer. This also causes the light that impinges on the side of the opening during the convergence of particles, as shown in FIG. 3A, to effectively reflect, and enables enhancing the reflectivity of obliquely incident light, in particular. In such a structure in which light is reflected by the electrode 123 that is provided on the side of the opening, it is preferable that the electrode not be exposed to the top surface of the opening, as shown in FIGS. 3A and 3B. However, a structure is also effective in which the electrode 123 is exposed to the periphery of the opening, or the part extending from the side to the top of the insulating layer is exposed, as shown in FIGS. 4A and 4B,.

Figure 9:
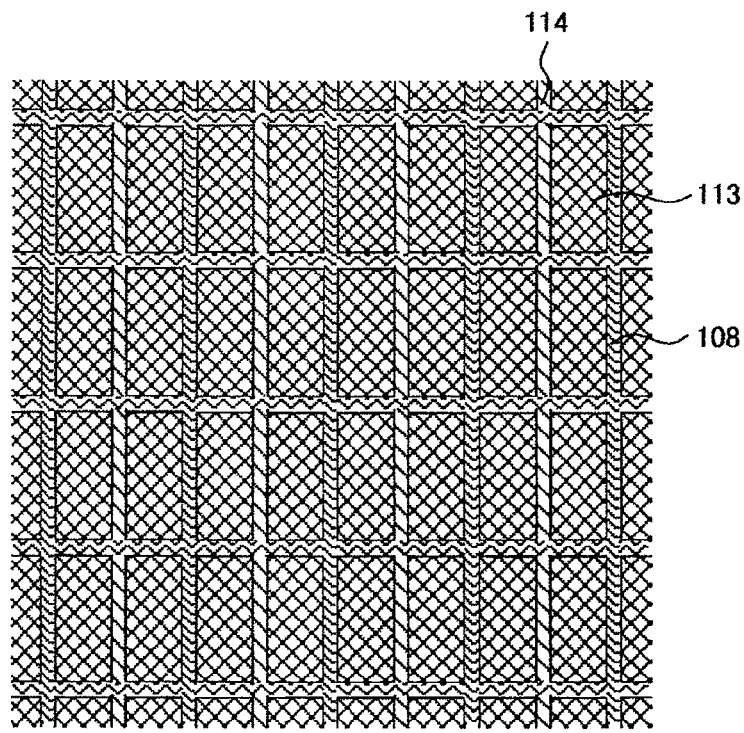
FIG. 9 is a diagram showing an embodiment of a planar structure of a display according to the present invention.
Figure 10:
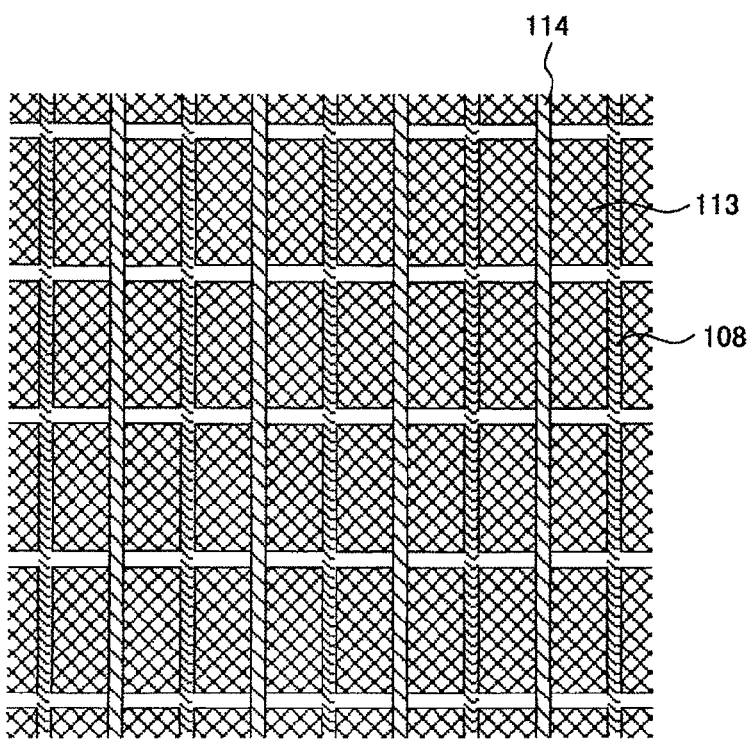
FIG. 10 is a diagram showing another embodiment of a planar structure of a display according to the present invention.

Here, the opening 114 of the insulating layer 110 may be formed in a stripe shape as shown in FIG. 9 or FIG. 10. In the present embodiment, one stripe-shaped opening 114 is provided on the center of the pixel, and the pixel electrode is covered by a coating part 113 of the insulating layer in the rest part of the pixel. However, a plurality of strip-shaped openings may be provided in the pixel. It should be noted that FIG. 9 shows a structure in which partitions 108 are provided in a lattice shape for each pixel, with each pixel encircled by a pair of substrates and partitions, while FIG. 10 shows a structure in which partitions 108 are provided in parallel as is the case with the opening 114.

Figure 11:
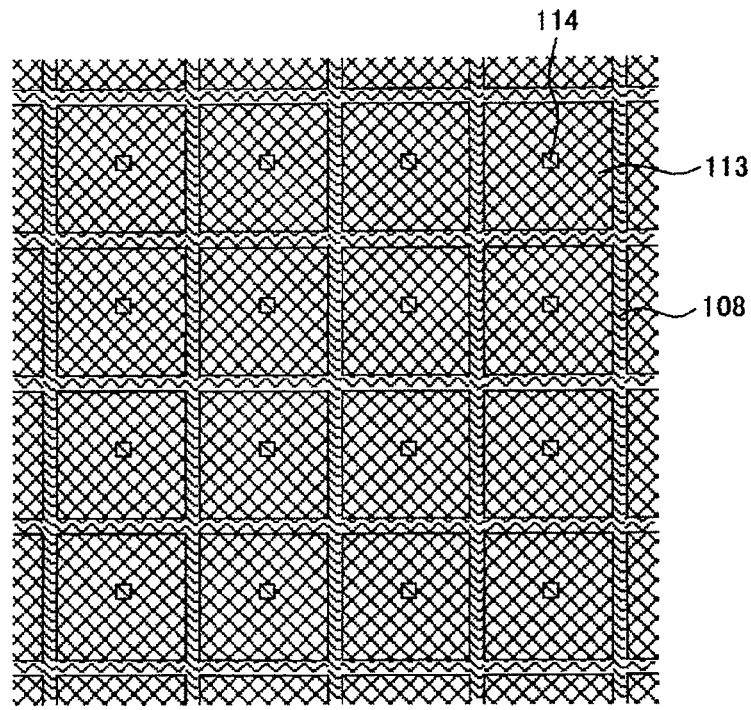
FIG. 11 is a diagram showing another embodiment of a planar structure of a display according to the present invention.
Figure 12:
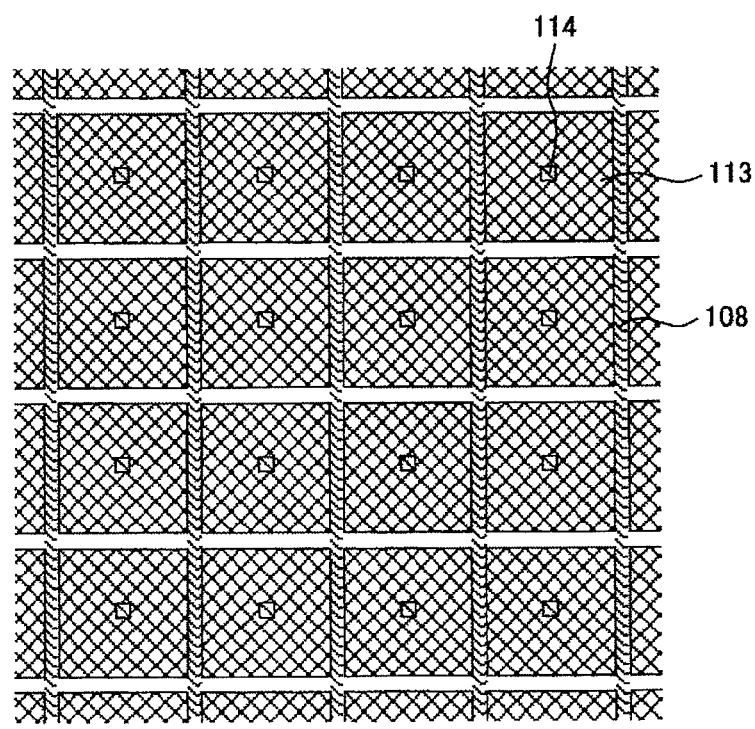
FIG. 12 is a diagram showing another embodiment of a planar structure of a display according to the present invention.

Moreover, the shape of the opening 114 includes those shown in FIGS. 11 and 12, which show an embodiment in which a square-shaped opening 114 is formed in the center of the pixel. Such a shape of opening 114 is preferable, since it would enable increasing aperture ratio when the same minimum processing line width is used. Note that the difference between FIG. 11 and FIG. 12 lies in the structure of the partition 108, as is the case with the difference between FIG. 9 and FIG. 10.

Figure 5A:
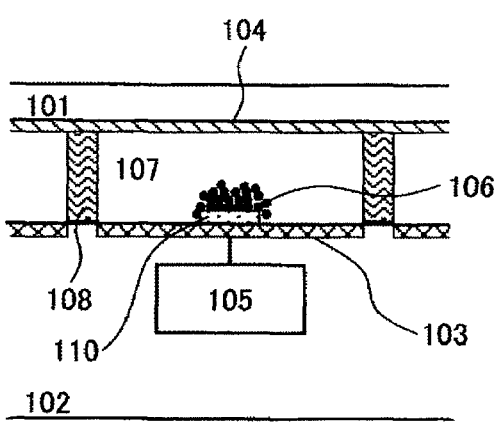
FIGS. 5A and 5B are diagrams showing another embodiment of a cross-sectional structure of a display according to the present invention.
Figure 5B:
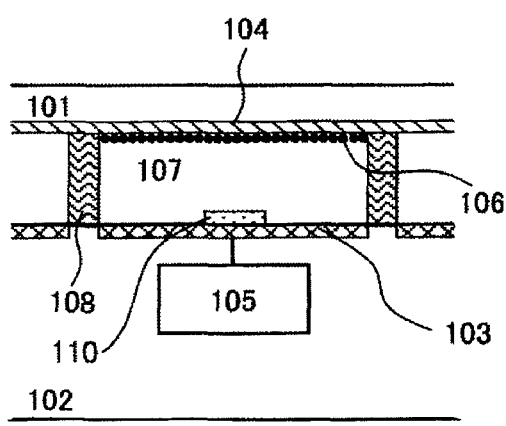

When the insulating layer 110 has a higher dielectric constant than the transparent medium 107, the charged particles sometimes converge on the insulating layer 110. In this case, a display is provided that has a structure in which the opening 114 of the insulating layer and the coating part 113 are reversed, and has equally high reflectivity and contrast ratio, as shown in FIG. 5A.

Although partitions 108 are formed in the same pitch as that of the pixel in FIGS. 9, 10, 11 and 12, it is also effective even if they are formed to be an integer multiple of the pixel pitch.

In the present invention, the transparent medium 107 is a colorless liquid such as water, alcohol, oil, and petroleum. A gas such as oxygen, nitrogen, inert gas, and air, or a vacuum can also obtain a similar effect. Moreover, the effect of the colored charged particles 106 is obtained by charging the colorant of a desired color. For example, black charged particles can be used to provide a display capable of displaying black and white. It is also possible to provide a display that exhibits colors according to the colors absorbed by the charged particles.

The material used for the partition is an organic material such as polyvinyl cinnamate, azide-novolak resin, polystyrene-based polymer, methacrylate-based polymer, acrylic resin, cardo polymer, and fluoride resin, or a transparent inorganic material. These materials can be formed by a method such as photo sensitive photolithography and etching, or thermal deformation while casting a material into a mold.

Furthermore, in the present embodiment, if a conductive material that reflects visible light is used for the pixel electrode 103, the part doubles as a reflecting layer, thus providing a high definition display with a low parallax. The conductive material for reflecting visible light is a metal material such as Al, Ag, Cr, Mo, Au, Ni, and Cu, which can be used singly or in combination. Preferably, a metal material that is predominantly composed of Al or Ag in particular is used, since the material provides a high reflectivity across the visible light region.

The pixel electrode 103 also affects electrical characteristics. The electrode material causes a change in the contact interface state with the transparent medium 107, and a change in the convergence and dispersion of the charged particles. An electrically excellent electrode material that converges and disperses charged particles in an excellent manner, and achieves a high reflectivity as well as high contrast is not necessarily an optically preferable material.

Figure 33:
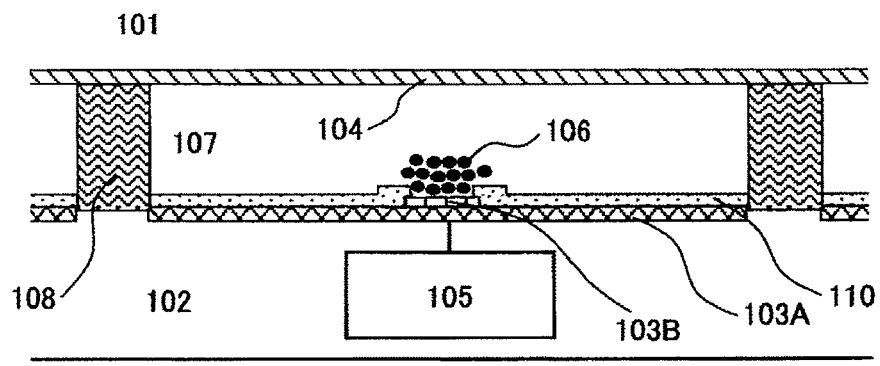
FIG. 33 is a diagram showing another embodiment of a cross-sectional structure of a display according to the present invention.

In this case, the pixel electrode may be two-layer structured as shown in FIG. 33. One layer is a first metal layer 103A formed on the substrate 102 in the pixel. The other layer is a second metal layer 103B formed on a position on the first metal layer 103A which corresponds to the opening of the insulating layer 110. In this event, the first metal layer 103A is configured to have higher reflectivity than that of the second metal layer 103B. This configuration is effective in converging and dispersing the charged particles in a satisfactory manner, and in obtaining a high reflectivity and high contrast. Details will be described in embodiments discussed later.

It should be noted that the effects of the second metal layer 103B can be achieved if the metal layer 103B at least exists on just the position corresponding to the opening of the insulating layer 110.

Figure 34:
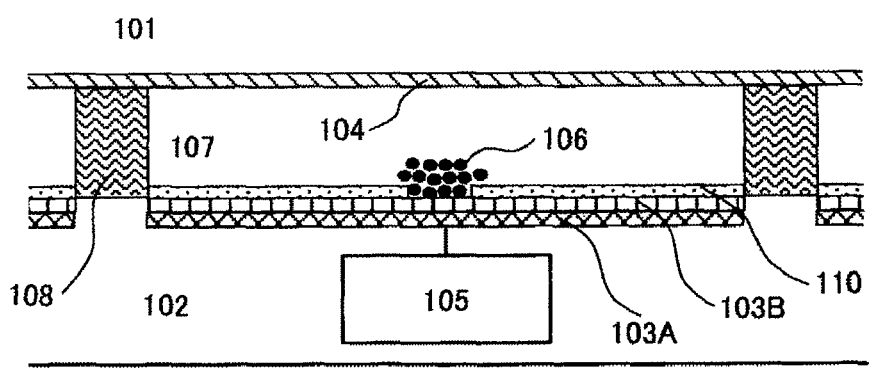
FIG. 34 is a diagram showing another embodiment of a cross-sectional structure of a display according to the present invention.

When the electrode material of the second metal layer 103B comprises a transparent electrode material such as ITO, IZO, and SnOx, the second metal layer 103B may be formed only in the vicinity of the opening of the insulating layer 110 as shown in FIG. 33. However, the first metal layer 103A and the second metal layer 103B are formed across the entire surface of the pixel, as shown in FIG. 34. More specifically, when the first metal layer 103A and the second metal layer 103B are formed in substantially the same electrode size, they can be processed in a collective manner, thus being effective in simplifying the manufacturing process. Details will be described in the embodiments discussed later.

An inorganic insulative oxide such as SiN and SiOx is appropriate for a material for forming the insulating layer 110. When the insulating layer 110 is formed to have a thickness about several times the charged particle as shown in FIG. 2A and 2B, the inorganic insulative oxide such as SiN and SiOx may be thickly formed. However, it is preferable that an organic material such as polyvinyl cinnamate, azide-novolak resin, polystyrene-based polymer, methacrylate-based polymer, acrylic resin, card polymer, and fluoride resin be used. This reduces the film formation time.

Reflected light from the surface and from the back surface of the insulating layer 110 interfere with each other to emit light having a peak wavelength. It is preferable that a setting be made such that light is emitted that has a peak wavelength in the vicinity of 550 nm, where the luminosity factor is maximum. This provides a bright display. Therefore, assuming that the index of refraction of the material that constitutes the thickness of the insulating layer tp is np, and assuming $$250 \text{ nm} < (np \times tp)/N < 315 \text{ nm} \quad (1)$$

where N is an integer, then the peak wavelength of the reflected light is from 500 nm to 630 nm, where 30% or more of the maximum luminous efficiency is obtained. This is preferable. Moreover, assuming $$255 \text{ nm} < (np \times tp)/N < 305 \text{ nm} \quad (2)$$

where N is an integer, then the peak wavelength of the reflected light is from 510 nm to 610 nm wavelength, where 50% or more of the maximum luminous efficiency is obtained. This is more preferable. In addition, assuming $$260 \text{ nm} < (np \times tp)/N < 245 \text{ nm} \quad (3)$$

where N is an integer, then the peak wavelength of the reflected light is from 520 nm to 590 nm, where 70% or more of the maximum luminous efficiency is obtained. This is particularly preferable.

Furthermore, when the electrode part is constituted of two layers, i.e., the second metal layer 103B of a transparent electrode material and the first metal layer 103A of a highly reflective material as illustrated in FIG. 34, reflected light from the surface of the insulating layer and from the back surface of the second metal layer interfere with each other to emit light having a peak wavelength. It is preferable that a setting be made such that light is emitted that has a peak wavelength in the vicinity of 550 nm, where the luminosity factor is maximum. This provides a bright display. Therefore, assuming that the index of refraction of a material that constitutes thickness tb of the second metal layer which comprises the transparent electrode material and the thickness tp of the insulating layer is np and nb, and assuming $$250 \text{ nm} < (np \times tp + nb \times tb)/N < 315 \text{ nm} \quad (4)$$

where N is an integer, then the peak wavelength of the reflected light is from 500 nm to 630 nm, where 30% or more of the maximum luminous efficiency is obtained. This is preferable. Moreover, assuming $$255 \text{ nm} < (np \times tp + nb \times tb)/N < 305 \text{ nm} \quad (5)$$

where N is an integer, then the peak wavelength of the reflected light is from 510 nm to 610 nm wavelength, where 50% or more of the maximum luminous efficiency is obtained. This is more preferable. In addition, assuming $$260 \text{ nm} < (np \times tp + nb \times tb)/N < 245 \text{ nm} \quad (6)$$

where N is an integer, then the peak wavelength of the reflected light is from 520 nm to 590 nm, where 70% or more of the maximum luminous efficiency is obtained. This is particularly preferable.

For the material of the partition, an organic material such as polyvinyl cinnamate, azide-novolak resin, polystyrene-based polymer, methacrylate-based polymer, acrylic resin, cardo polymer, and fluoride resin, or a transparent inorganic material is used. These materials can be formed by a method such as photo sensitive photolithography and etching, or thermal deformation while casting a material into a mold.

As described above, the organic material is used to form the insulating layer 110 and partitions 108. The organic material is preferable, since it reduces processing time compared with the inorganic material. However, the mixture of impurities, moisture, or the like into the transparent medium can cause a change in ion concentration, resulting in the deterioration of the conversion and dispersion of particles. In this case, preferably the surface of the organic material is coated with an inorganic insulating film of an inorganic material.

Figure 35:
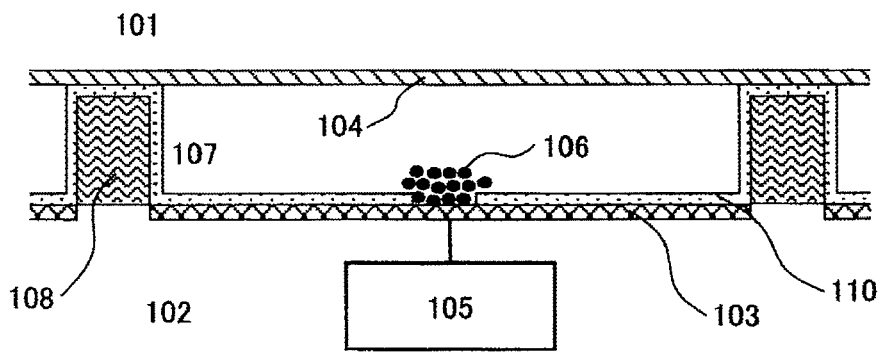
FIG. 35 is a diagram showing another embodiment of a cross-sectional structure of a display according to the present invention.

In FIG. 35, the partitions 108 are formed of the organic material, and are coated with the inorganic material. In this structure, the inorganic material that constitutes the insulation layer 110 on the pixel electrode 103 also covers the partitions 108 in a collective manner. Therefore, the manufacturing process is simplified.

Figure 36:
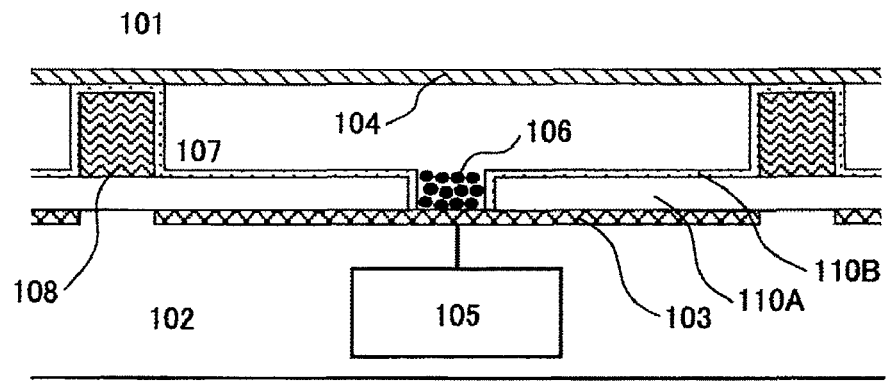
FIG. 36 is a diagram showing another embodiment of a cross-sectional structure of a display according to the present invention.

Furthermore, when the first insulating layer 110A is thickly formed through the use of an organic material as illustrated in FIG. 36, it is preferable that the surface of the organic insulating layer be formed of the second insulating layer 110B which is comprised of an inorganic material. This allows the first insulating layer 110, which is the organic insulating layer, and the partitions 108 to be collectively coated with the second insulating layer 110B, thus advantageously enabling the simplification of the process. In this event, reflected light from the surface and from the back surface of the second insulating layer 110B formed of the organic material interfere with each other to emit light having a peak wavelength. A bright display is advantageously provided by making a setting such that light is emitted that has a peak wavelength in the vicinity of 550 nm, where the luminosity factor is maximum. Therefore, assuming that the index of refraction of a material that constitutes the thickness tn of the second metal layer 110B which is comprised of an inorganic material is nn, and assuming $$250 \text{ nm} < (nn \times tn)/N < 315 \text{ nm} \tag{7}$$

where N is an integer, then the peak wavelength of the reflected light is from 500 nm to 630 nm, where 30% or more of the maximum luminous efficiency is obtained. This is preferable. Moreover, assuming $$255 \text{ nm} < (nn \times tn)/N < 305 \text{ nm} \tag{8}$$

where N is an integer, then the peak wavelength of the reflected light is from 510 nm to 610 nm, where 50% or more of the maximum luminous efficiency is obtained. This is more preferable. In addition, assuming $$260 \text{ nm} < (nn \times tn)/N < 245 \text{ nm} \tag{9}$$

where N is an integer, then the peak wavelength of the reflected light is from 520 nm to 590 nm, where 70% or more of the maximum luminous efficiency is obtained. This is particularly preferable.

Furthermore, in a structure of FIG. 36, in which the electrode part is constituted of two layers, i.e., a pixel electrode of a transparent electrode material, and a pixel electrode of a highly reflective material, reflected light from the surface and from the back surface of these transparent electrode materials interfere with each other to emit a peak wavelength. A bright display is advantageously provided by making a setting such that light is emitted that has a peak wavelength in the vicinity of 550 nm, where the luminosity factor is maximum. Therefore, assuming that the index of refraction of the material that constitutes the thickness tb of the transparent electrode material is nb, and assuming $$250 \text{ nm} < (nb \times tb)/N < 315 \text{ nm} \tag{7}$$

where N is an integer, then the peak wavelength of the reflected light is from 500 nm to 630 nm, where 30% or more of the maximum luminous efficiency is obtained. This is preferable. Moreover, assuming $$255 \text{ nm} < (nb \times tb)/N < 305 \text{ nm} \tag{8}$$

where N is an integer, then the peak wavelength of the reflected light is from 510 nm to 610 nm, where 50% or more of the maximum luminous efficiency is obtained. This is more preferable. In addition, assuming $$260 \text{ nm} < (nb \times tb)/N < 245 \text{ nm} \tag{9}$$

where N is an integer, then the peak wavelength of the reflected light is from 520 nm to 590 nm, where 70% or more of the maximum luminous efficiency is obtained. This is particularly preferable.

Figure 7A:
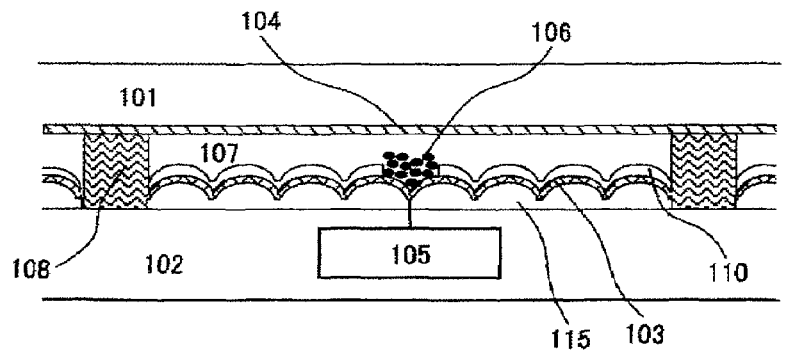
FIGS. 7A to 7D are diagrams showing another embodiment of a display according to the present invention.

Moreover, it is possible to diffuse the reflected light by providing appropriate unevenness to the reflecting surface. It is possible to set a range in which the reflected light can be diffused by adjusting the unevenness of the diffuse reflecting surface. The diffuse reflecting surface can diffuse the reflected light within a desired range through the uneven shape. High-intensity images are obtained at an appropriate range by narrowing the diffusion range. Such diffusion properties are provided through the diffuse reflection effect by, for example, forming the pixel electrode 103 on an uneven layer 115 which is formed of an insulative material such as resin, as illustrated in FIG. 7A.

Figure 7B:
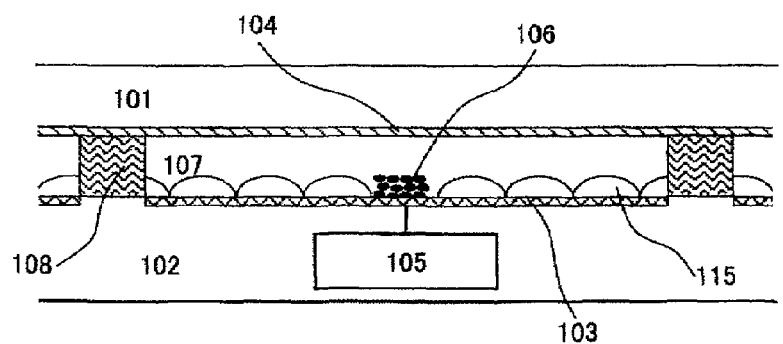
Figure 7C:
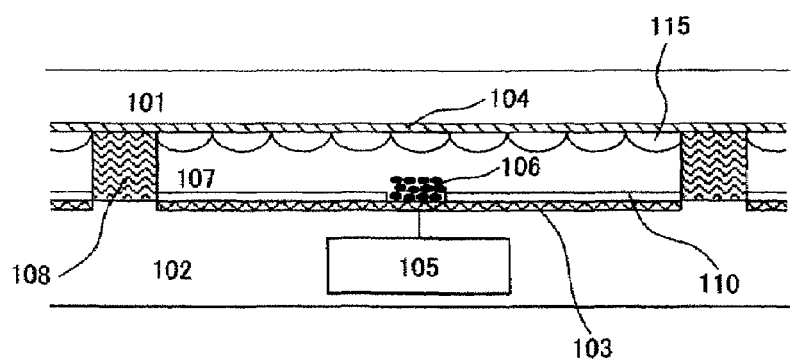

When the uneven layer 115 is both insulative and transparent, and has a reflectivity different from that of the transparent medium 107, similar diffusion properties are provided through the lens effect by forming the uneven layer 115 on the pixel electrode 103 or on the internal surface of the substrate 101 as illustrated in FIGS. 7B and 7C. Here, when the uneven layer 115 is provided on the pixel electrode 103, the uneven layer 115 may double as the insulating layer as illustrated in FIG. 7B, or an insulating layer may additionally be provided. Furthermore, when the uneven layer 115 is transparent and has a reflectivity other than 1, a display is provided that is capable of adjusting the diffusibility and has an appropriate viewing angle characteristic through the lens effect by providing the uneven layer on the surface of the substrate 101 as illustrated in FIG. 7D.

Figure 7D:
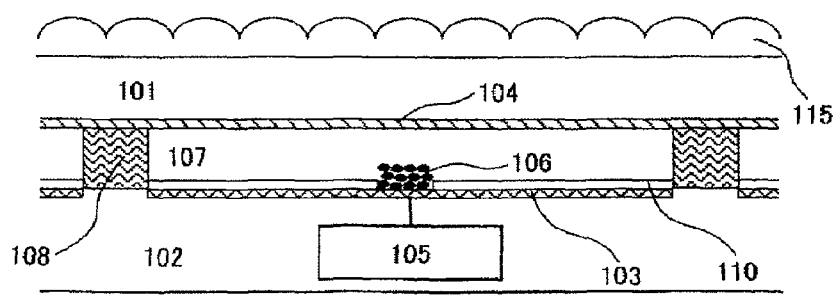

In the structures illustrated in FIGS. 7C and 7D, the uneven layer 115 may be formed by using a method such as coating and exposing the substrate 101, or adhering a film-like material to the substrate 101. Alternatively, it may be formed directly by using a method such as thermally deforming or chemically etching the surface or the back surface of the substrate. In addition, the methods that are described in FIGS. 7A to 7D so as to obtain desired diffusibility may be used singly or in combination.

Figure 32:
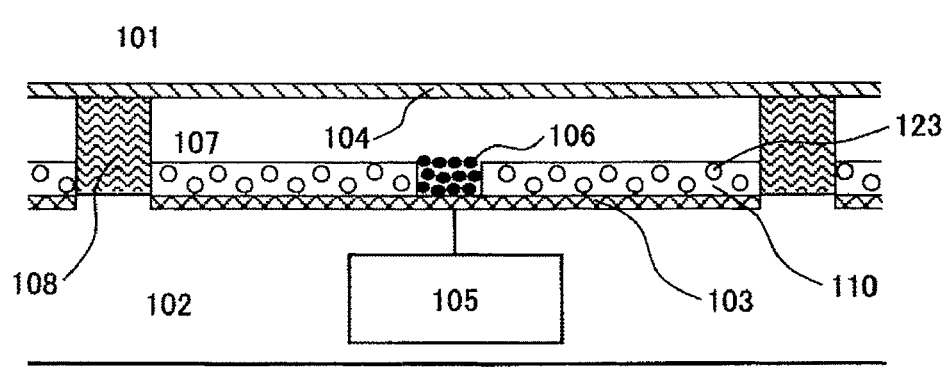
FIG. 32 is a diagram showing another embodiment of a cross-sectional structure of a display according to the present invention.

Moreover, a similar diffusion effect is obtained through multiple scattering by dispersing transparent particles that have a reflectivity different from that of the insulating layer 110 in the insulating layer 110 as illustrate in FIG. 32.

Furthermore, in order to increase the intensity of the screen and thereby to obtain reflected colors close to pure white when displaying white, a fluorescent brightening agent, which absorbs ultraviolet light on the reflecting surface and emits visible light, may be applied on the reflecting layer or on the insulating layer 110. Alternatively, a similar effect is also obtained by containing the fluorescent brightening agent in the insulating layer 110 or in the transparent medium. For the fluorescent brightening agent, diaminostilbene, imidazole, imidazolone, triazole, thiazol, oxazole, oxadiazole, coumarin, thiazole, naphthalimide and the like may be used simply or in combination.

For the counter electrode 104, any of such transparent conductive materials such as ITO, IZO, and $SnO_2$ can be used.

Figure 31:
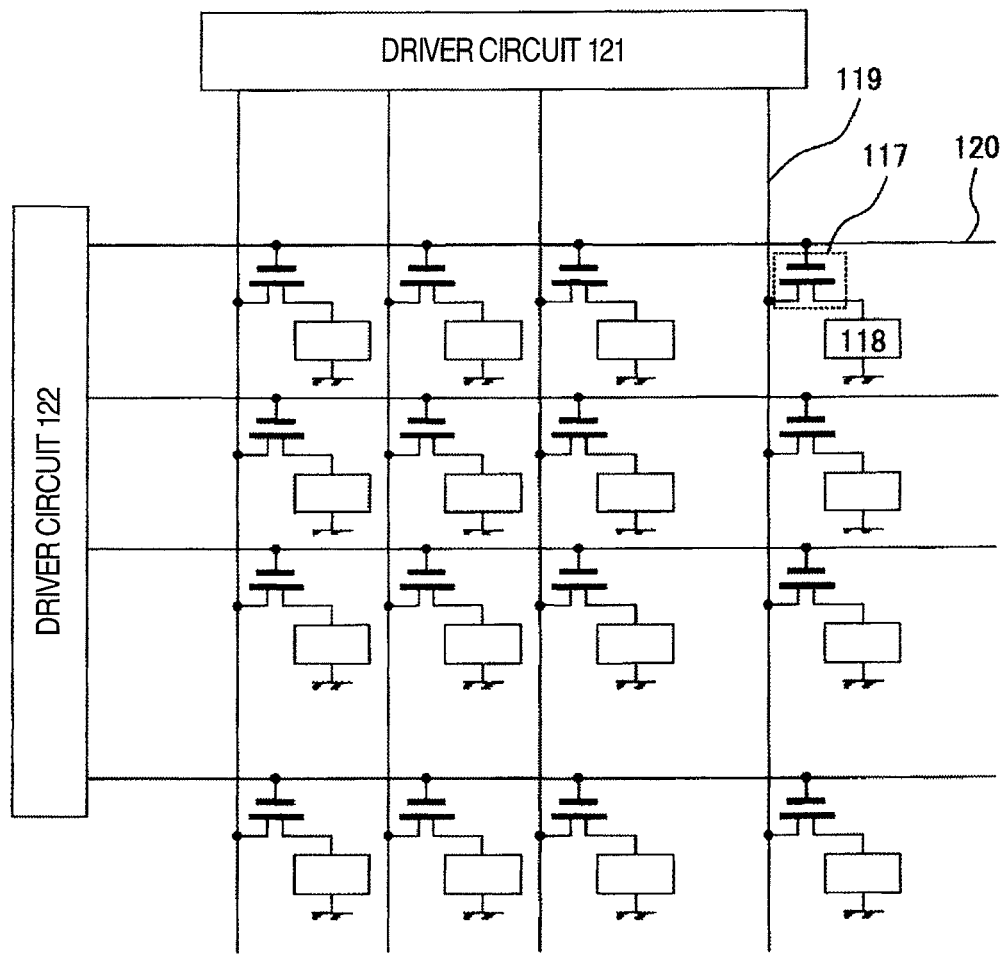
FIG. 31 is an exemplary driving circuit of a display according to the present invention.

For the particle driving means 105 as a switching part, thin film transistors may be used that are assembled in a matrix on a substrate comprised of glass, plastic or the like, which is formed on a silicon substrate. Images may be displayed by assembling thin film transistors 117 as shown in FIG. 31, which are formed of a material such as, for example, amorphous silicon or polycrystalline silicon, in a matrix shape, and by performing driving by a drain line 119 and a gate line 120 based on driver circuits 121 and 122, and by controlling the motion of particles. The thin film transistors 117 are controlled by the driver circuits 121 and 122 via the drain line 119 and gate line 120.

Figure 39:
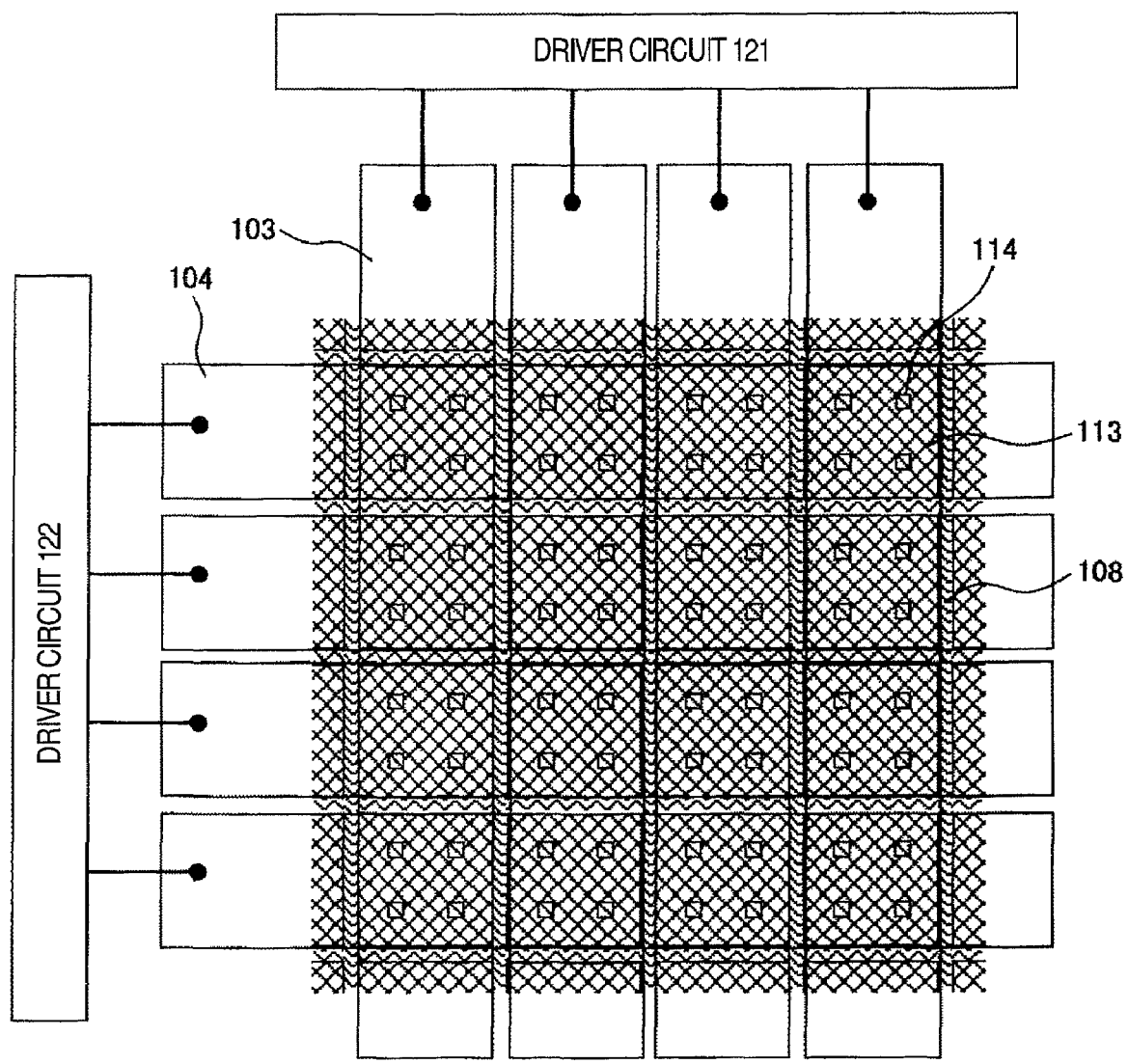
FIG. 39 is a diagram showing an exemplary simple matrix drive of a display according to the present invention.

Furthermore, simple matrix driving can also be performed by forming the transparent pixel electrode 103 and the counter electrode 104 in a strip shape and combining them with driver circuits 121 and 122 as illustrated in FIG. 39.

In the structures thus far described, it is preferable that a plurality of openings 114 of the insulating layer, where charged particles are converged while white is displayed, be provided within the pixel. This would reduce the moving distance for the charged particles within the pixel, thus making it possible to shorten the display switching time.

Figure 13:
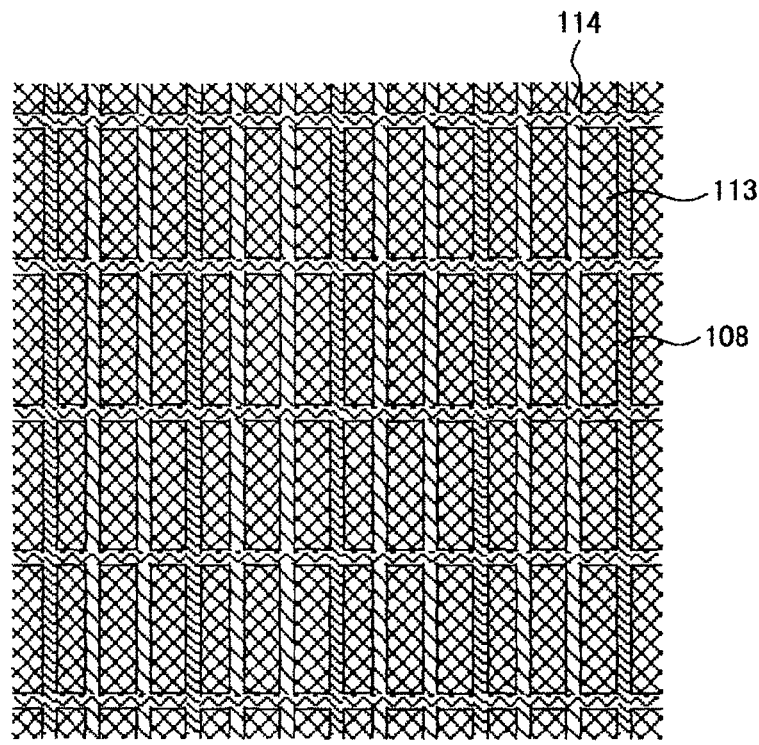
FIG. 13 is a diagram showing another embodiment of a planar structure of a display according to the present invention.
Figure 14:
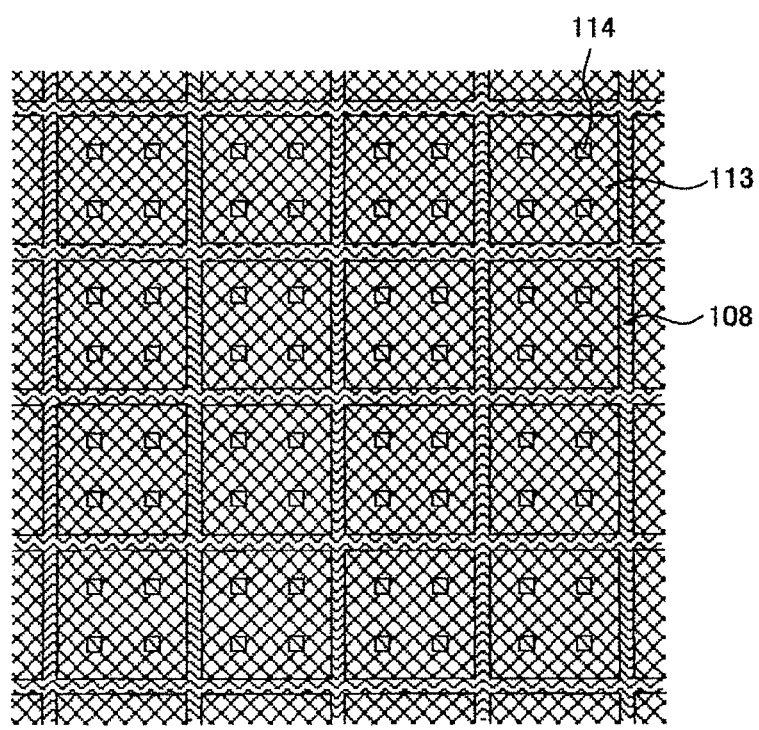
FIG. 14 is a diagram showing another embodiment of a planar structure of a display according to the present invention.
Figure 15:
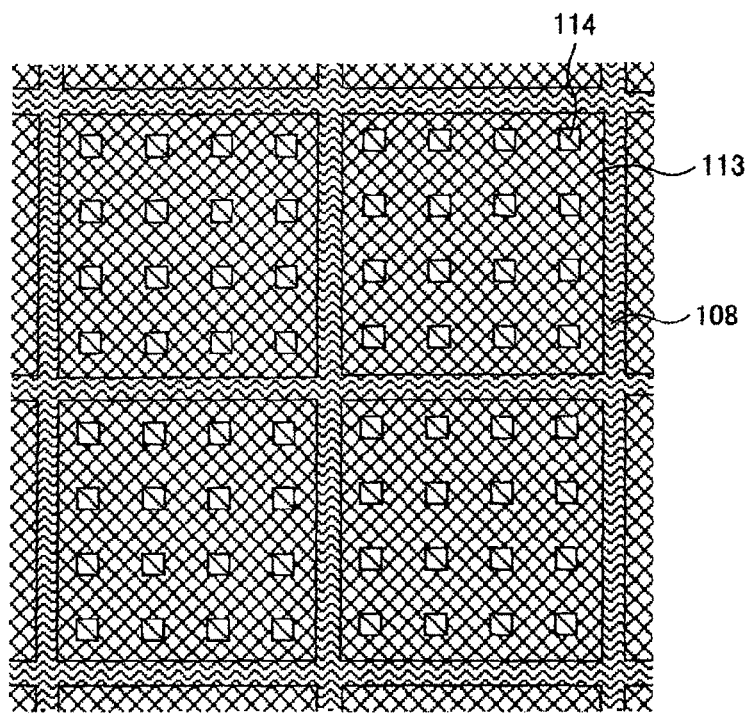
FIG. 15 is a diagram showing another embodiment of a planar structure of a display according to the present invention.

FIGS. 13 and 14 show exemplary structures in which a plurality of insulating layer openings are provided within the pixel based on the upper surface structures of FIGS. 9 and 11, in which each pixel is separated by lattice-shaped partitions.

Figure 6A:
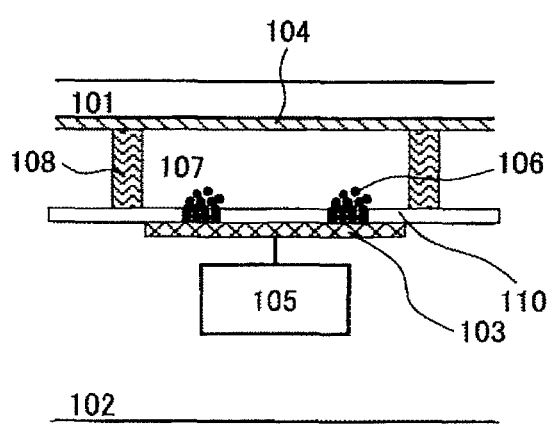
FIGS. 6A and 6B are diagrams showing another embodiment of a cross-sectional structure of a display according to the present invention.
Figure 6B:
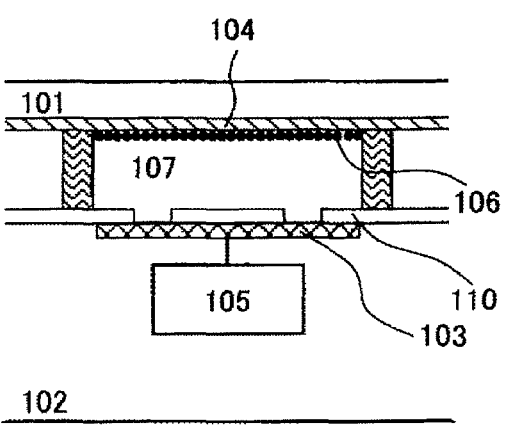

Their cross-sectional structures are illustrated in FIGS. 6A and 6B. In FIGS. 6A and 6B, while double electrodes are described in one direction of the pixel, there is no limitation thereto. In addition, the number of openings need not necessarily be identical in two directions on the plain surface as illustrated in FIG. 14. The shape of the opening is not limited to a square. Instead, it may be circular or polygonal.

Figure 17:
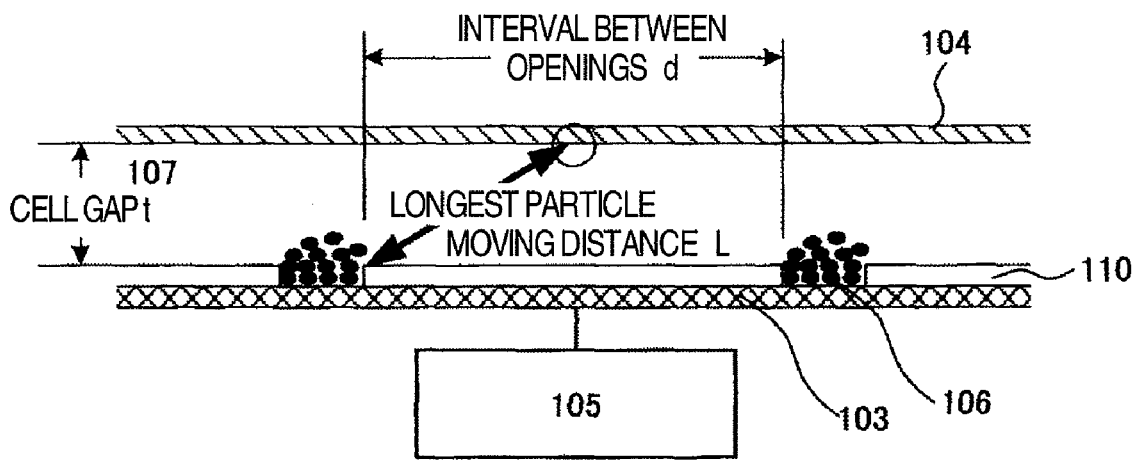
FIG. 17 is an explanatory diagram of the longest particle moving distance in a display according to the present invention.

As described above, the response time when images are switched in the present display depends on the particle moving distance. More specifically, what determines the response time is the moving distance that is longest in the pixel space. In other words, in the pixel composition illustrated in FIG. 17, the distance between one insulating layer opening and a position on the counter electrode 104 which corresponds to the middle of two insulating layer openings, which is farthest from the insulating layer opening, is the longest particle moving distance L. The longest particle moving distance L follows the following expression in which an interval between insulating layer openings is d, and a cell gap is t.

$$L = \{t^2 + (d/2)^2\}^{1/2}$$

Figure 18:
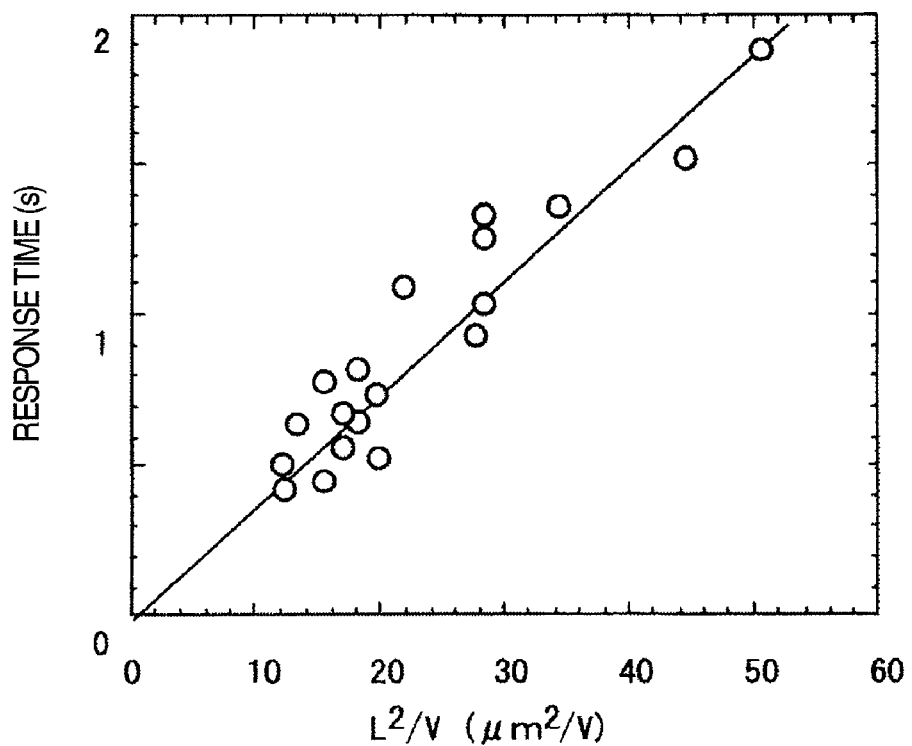
FIG. 18 is a relationship chart between the response time and the longest particle moving distance in a display according to the present invention.

Here, as illustrated in FIG. 18, the response time is represented by the following in which the longest particle moving distance is L and driving voltage is V.

$$\text{Response time} \propto L^2/V$$

Specifically, if the driving voltage is constant, then the response time increases in proportion to the square of the longest particle moving distance L. In this way, preferably the longest particle moving distance remains constant in the pixel, and as illustrated in FIGS. 9, 10, 11, and 12, when a single insulating layer opening is provided in each pixel, it is preferable that it be provided in the center of the pixel, since this enables the shortest response time.

When a plurality of insulating layer openings are provided as illustrated in FIGS. 13, 14, 15, and 16, preferably the openings are periodically disposed at the same pitch. When the openings are periodically disposed at the same pitch, preferably the openings are provided at the center of the region considering the case where equilateral triangular, square, and equilateral hexagonal regions are periodically disposed as illustrated in FIGS. 19, 20, 21 and 22.

Figure 19:
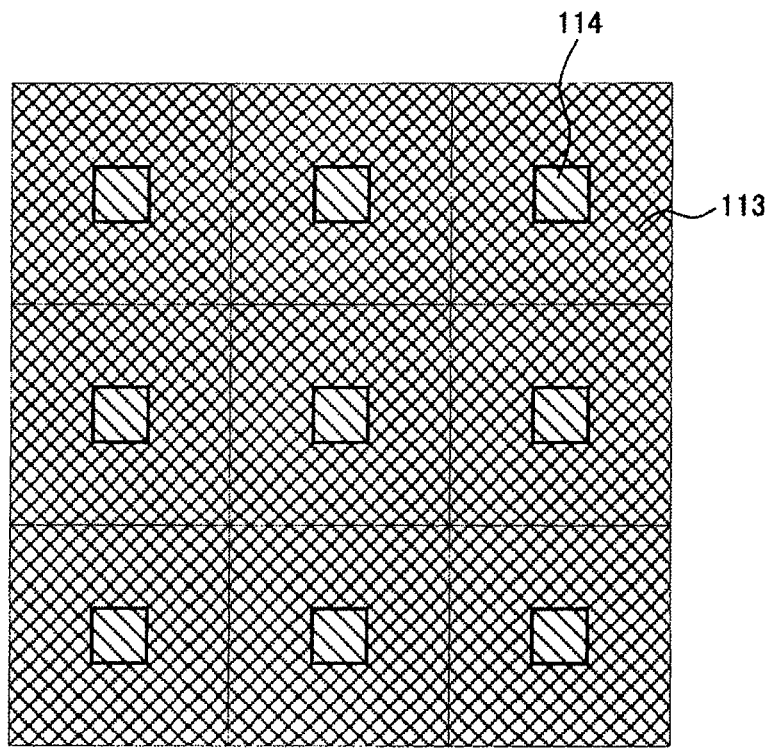
FIG. 19 is a diagram showing an embodiment of a planar structure in a pixel of a display according to the present invention.
Figure 20:
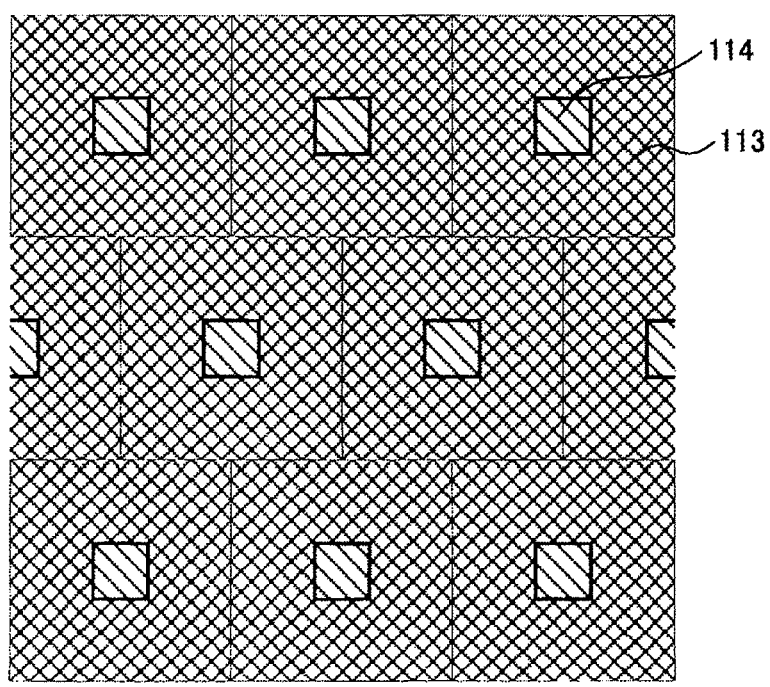
FIG. 20 is a diagram showing another embodiment of a planar structure in a pixel of a display according to the present invention.
Figure 21:
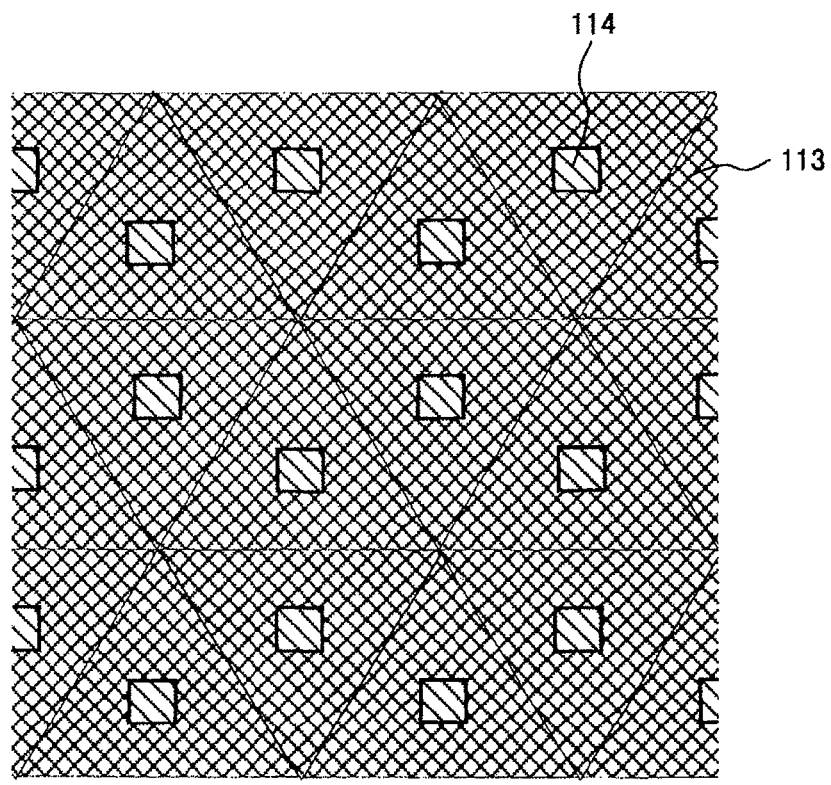
FIG. 21 is a diagram showing another embodiment of a planar structure in a pixel of a display according to the present invention.
Figure 22:
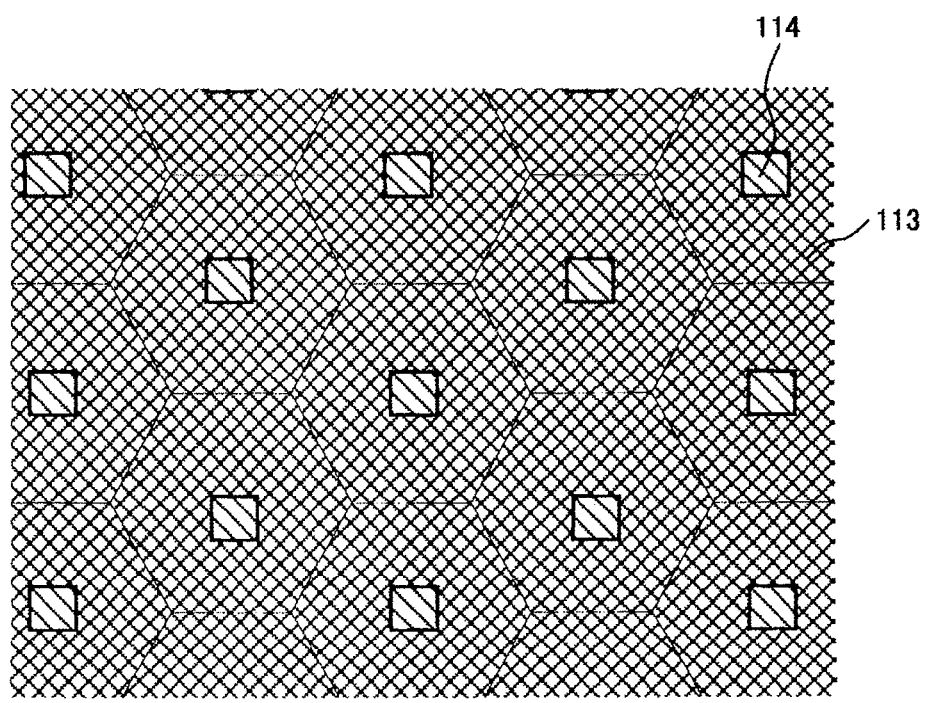
FIG. 22 is a diagram showing another embodiment of a planar structure in a pixel of a display according to the present invention.
Figure 23:
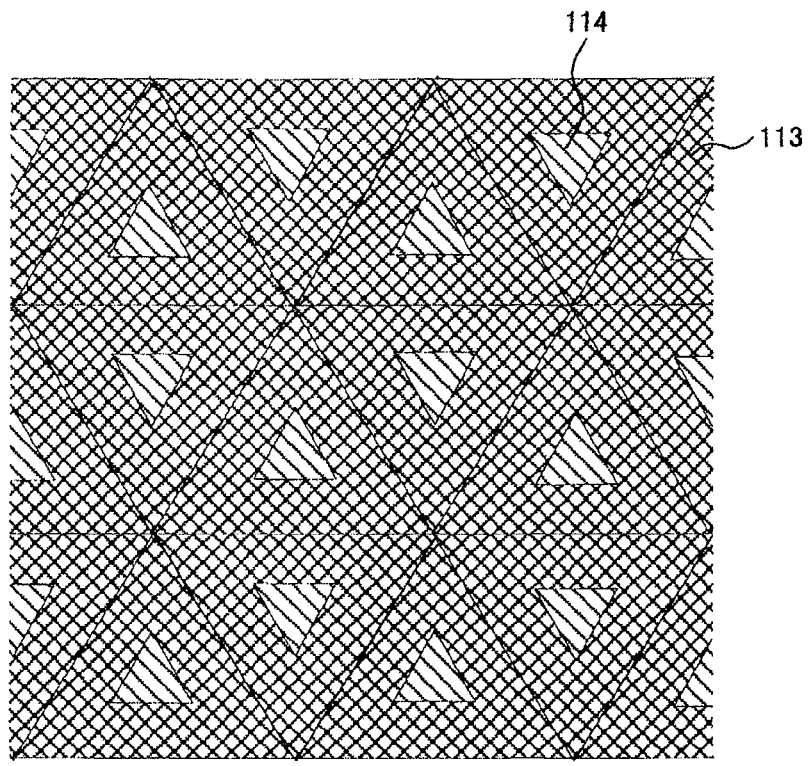
FIG. 23 is a diagram showing another embodiment of a planar structure in a pixel of a display according to the present invention.
Figure 24:
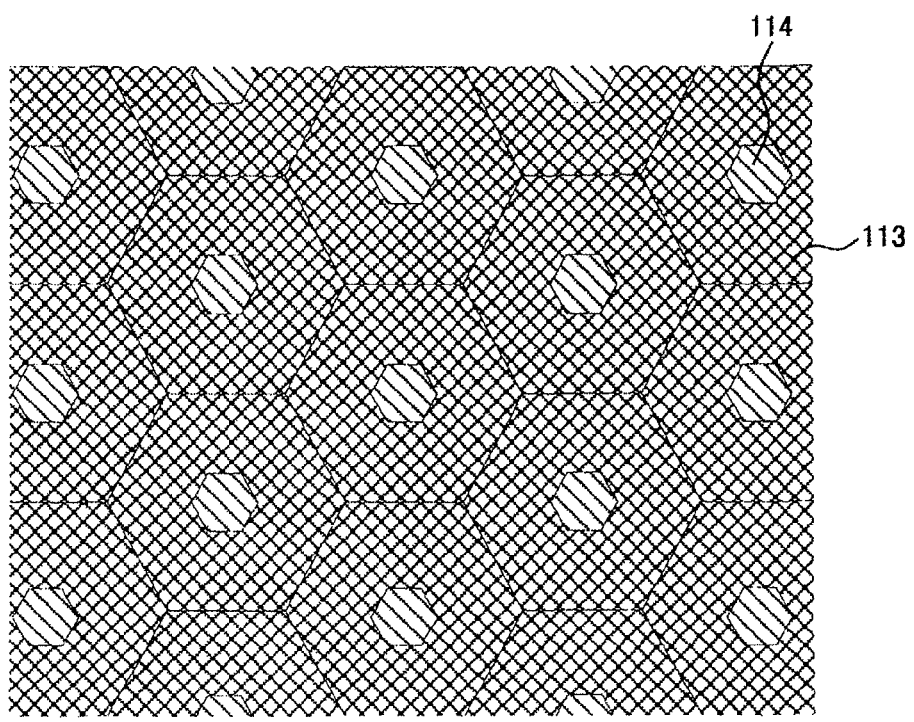
FIG. 24 is a diagram showing another embodiment of a planar structure in a pixel of a display according to the present invention.

FIG. 19 shows the case where a plurality of openings that are provided on the insulating layer are periodically disposed or provided at the center of the square regions. In this case, the top portion of the square is the farthest point from the opening. In contrast, when the square region is disposed with a displacement of half a cycle for each row in one direction, as illustrated in FIG. 20, it is possible to shorten the longest particle moving distance and thereby to further improve the response time. FIG. 21 shows the case where a plurality of openings that are provided on the insulating layer are periodically disposed and are provided at the center of the equilateral triangular regions. FIG. 22 shows the case where a plurality of openings that are provided on the insulating layer are periodically disposed and are provided at the center of the equilateral hexagonal regions. FIG. 23 shows the case where the shape of the pixel is equilateral triangular as is the case with FIG. 21, the shape of the opening is also equilateral triangular, and the openings are provided at the center of the equilateral triangular regions. FIG. 24 shows the case where the shape of the pixel is equilateral hexagonal as is the case with FIG. 22, and equilateral hexagonal openings are provided at the center of the equilateral hexagonal regions.

The response time is improved in the above all cases. In each case, the top portion in the equilateral triangular region is farthest from the opening. Therefore, it is preferable that the plurality of openings that are provided on the insulating layer be of a similar shape to the equilateral triangles that are periodically disposed. This would shorten the distance up to the top portion.

Figure 25:
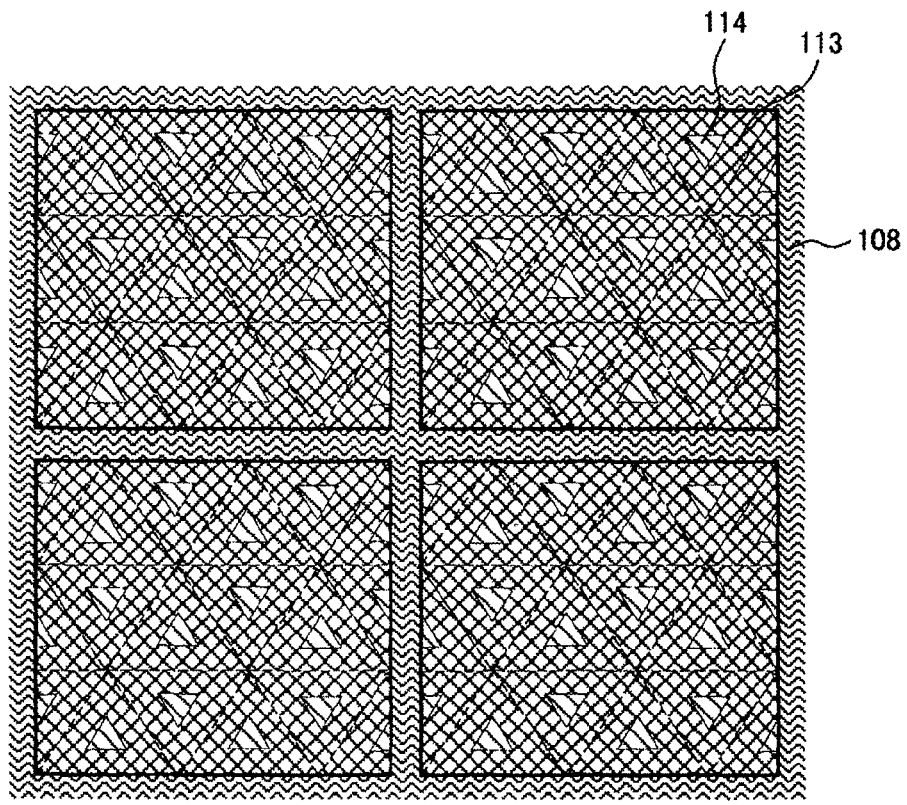
FIG. 25 is a diagram showing another embodiment of a planar structure of a display according to the present invention.
Figure 26:
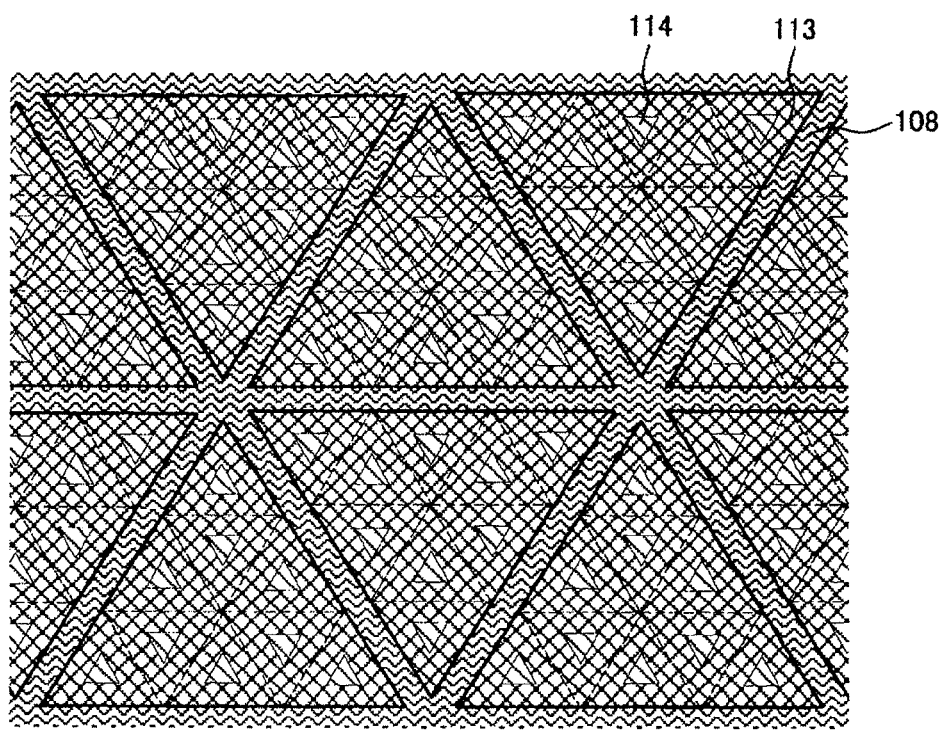
FIG. 26 is a diagram showing another embodiment of a planar structure of a display according to the present invention.
Figure 27:
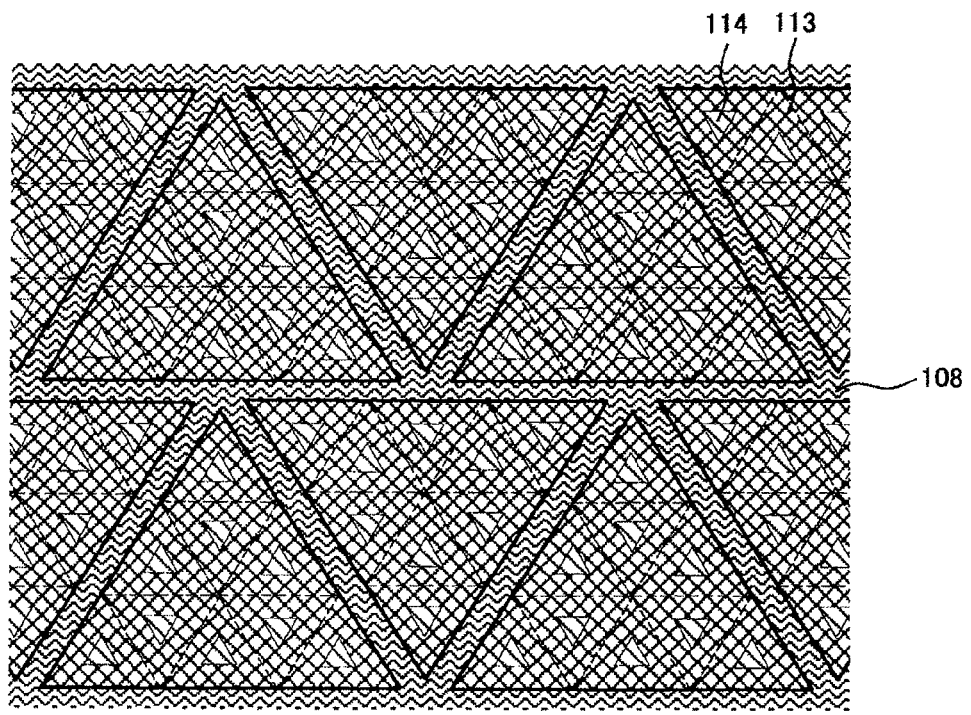
FIG. 27 is a diagram showing another embodiment of a planar structure of a display according to the present invention.
Figure 28:
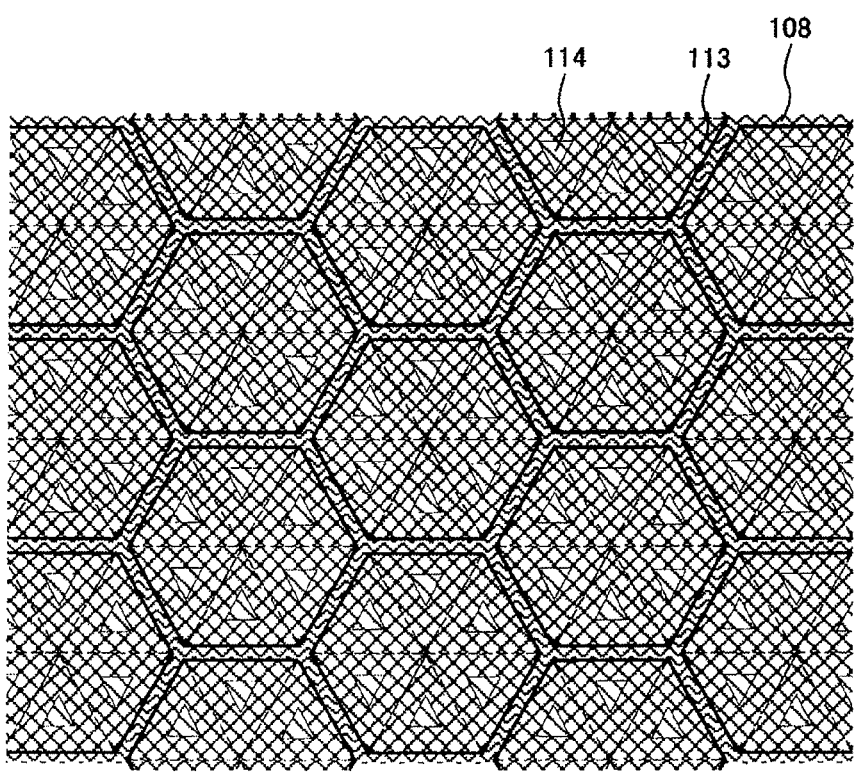
FIG. 28 is a diagram showing another embodiment of a planar structure of a display according to the present invention.
Figure 29:
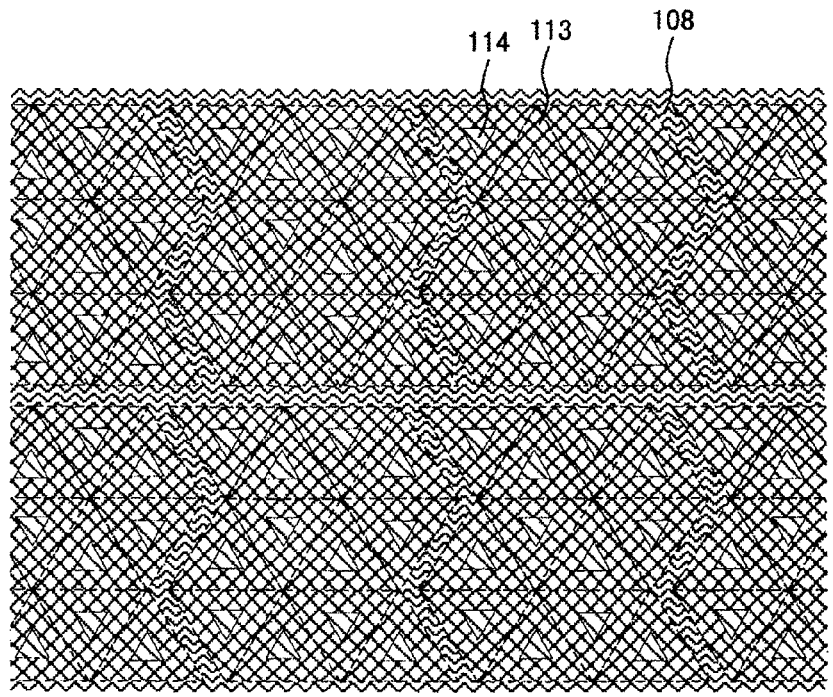
FIG. 29 is a diagram showing another embodiment of a planar structure of a display according to the present invention.
Figure 30:
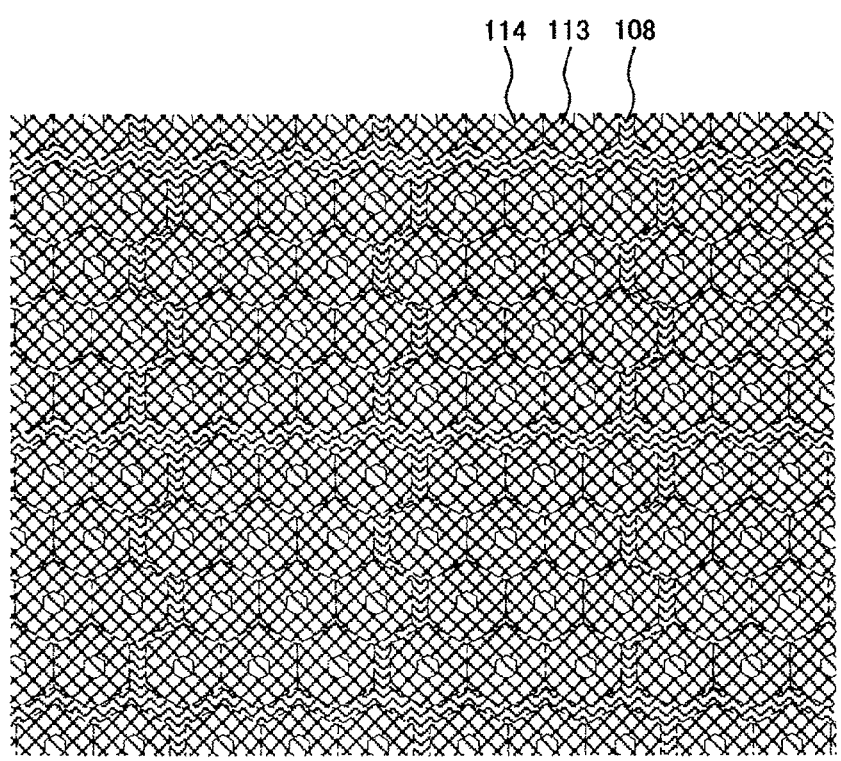
FIG. 30 is a diagram showing another embodiment of a planar structure of a display according to the present invention.

When equilateral triangular and equilateral hexagonal regions are periodically disposed and openings are disposed at the center thereof as in the above, the partition 108 may be formed in a tetragonal lattice shape as illustrated in FIG. 25. However, it is more preferable that the partition 108 be formed in an equilateral triangular lattice shape or in an equilateral hexagonal lattice shape in which regions can be filled as illustrated in FIGS. 26, 27 and 28, or be formed in a polygonal lattice shape that can be periodically disposed as described in FIGS. 29 and 30. It should be noted that FIGS. 25 to 29 illustrate the case where the opening has a tetragonal lattice shape.

Figure 8A:
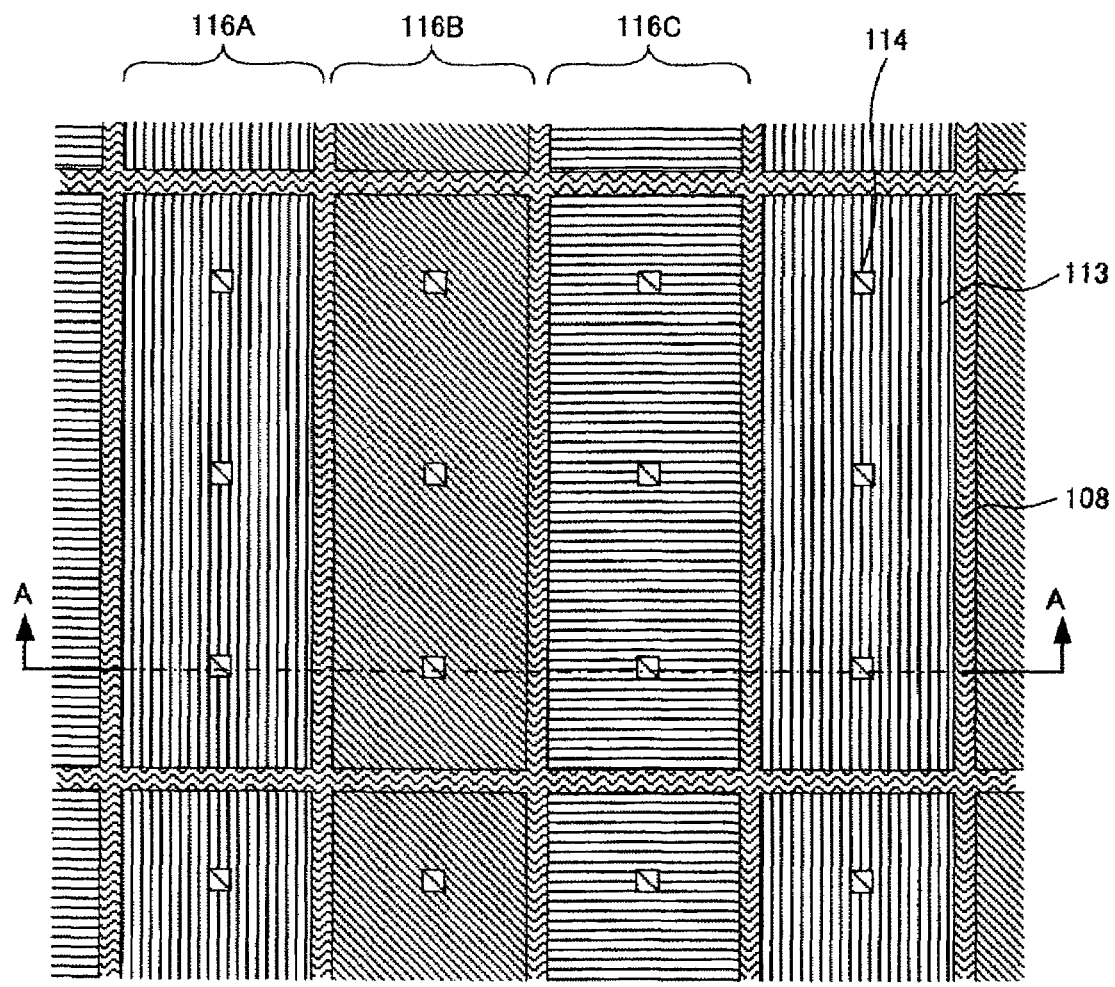
FIGS. 8A and 8B are diagrams showing an embodiment of a planer structure and a cross-sectional structure of a display according to the present invention.

In order to enable the display to display color images, sub pixel regions 116A to 116C, which are color display parts for displaying three colors of red, green and blue, may be provided in one pixel as illustrated in FIG. 8A. In this event, the charged particles are colored in black, the reflecting surface that comprises the substrate or the lower electrode is configured to have a substantially uniform reflectivity in the whole visible region, and a color filter may be disposed that transmits red, green and blue according to each color specification part. The color filter can be provided on the side of the substrate 101. However, if the color filter is disposed on the pixel electrode 103 after openings are provided to the insulative medium that selectively transmits red, green, and blue as illustrated in FIG. 8A, then a color display can be provided.

Embodiment 1

Next, one embodiment of the display according to the present invention will be described more specifically along with a manufacturing method therefor with reference to FIGS. 1A and 1B and FIG. 11.

FIG. 1A and 1B are cross-sectional diagrams of the display. A particle driving means 105, as a switching part, is formed on a glass substrate 102 in a two-dimensional array. On the glass substrate 102, a pixel electrode 103 is deposited by sputtering thereon using a metal material having a high reflectivity such as Al. Thereafter, the pixel electrode 103 is pattern-processed in a square shape through photolithography and wet etching. Furthermore, after an insulating layer 110 comprised of $SiO_2$ is deposited thereon through a plasma CVD method, openings are processed by lithography and dry etching. Moreover, partitions that each comprises cardo polymer and has a height of 5 μm are patterned into a lattice state to form the partitions 108. The part between the partitions 108 is filled with a transparent medium 107 that contains black charged particles 106 dispersed therein, and then sealed together with a substrate 101 that is formed with a counter electrode 104, which is an ITO transparent conductive film. Thus the display is provided.

As seen from a top surface diagram illustrated in FIG. 11, pixel electrodes 103 of the display are disposed in a two-dimensional array at an interval of 50 μm for each pixel, the pixels are partitioned by tetragonal lattice-shaped partitions 108, with each pixel being formed with pixel electrode 103, and a transparent insulating layer 110 is formed thereon. A square opening 114 is formed on the insulating layer 110 at a position corresponding to substantially the center between the lattice-shaped partitions 108. The counter electrode 104 is maintained at 0V, while the pixel electrode 103 is modulated between +10V and −10V by the operation of the particle driving means 105. In other words, images are displayed by changing the potential difference applied between the pixel electrode 103 and the counter electrode 104 and thereby switching between a state where black charged particles 106 that are dispersed in the transparent medium 107 converge in the vicinity of the opening 114 of the insulating layer (FIG. 1A), and a state where the particles 106 are dispersed across the entire surface of the pixel on the side of the counter electrode (FIG. 1B).

Here, the particle driving means 105 controls the motion of pixel cells 118 through the use of thin film transistors 117, as shown in FIG. 31, which are formed of a material such as, for example, amorphous silicon and polycrystalline silicon, and are assembled in a matrix state and, thus images being displayed. The thin film transistors are controlled by driver circuits 121 and 122 via drain lines 119, and gate lines 120.

For the colored charged particles used here, any of, for example, the various colored colorants or the like that are charged by a variety of methods are usable. For displaying black and white, for example, fine particles may be used in which carbon black colorants are surface coated with resin. For the transparent medium, any liquid can be used that is transparent, such as water, alcohol, and petroleum. The structure in which each pixel is partitioned by partitions as described in the present embodiment is preferable in that it prevents the disturbance due to the motion of the charged particles between pixels.

In addition, a metal material that has a high reflectivity in visible light such as aluminum, silver, and gold is more preferably used for the pixel electrode 103, since the material combined with a reflecting surface. In this case, minute unevenness is preferably provided on the surface of the electrode to form a diffuse reflecting surface that is capable of diffusing reflected light. The uneven shape would enable setting a desired range within which reflected light is dispersed. Furthermore, high intensity images will be obtained in an appropriate region by narrowing the diffusion range.

From the above, it is possible to provide a black and white display having a high aperture ratio, a high reflectivity, and a high contrast. In addition, since the substrate 101 is not patterned, it is possible to provide a high-definition display without the need to precise alignment between the substrate 101 and the substrate 102.

Embodiment 2

Next, another embodiment of the present display will be described more specifically along with a manufacturing method therefor with reference to FIGS. 8A and 8B.

Figure 8B:
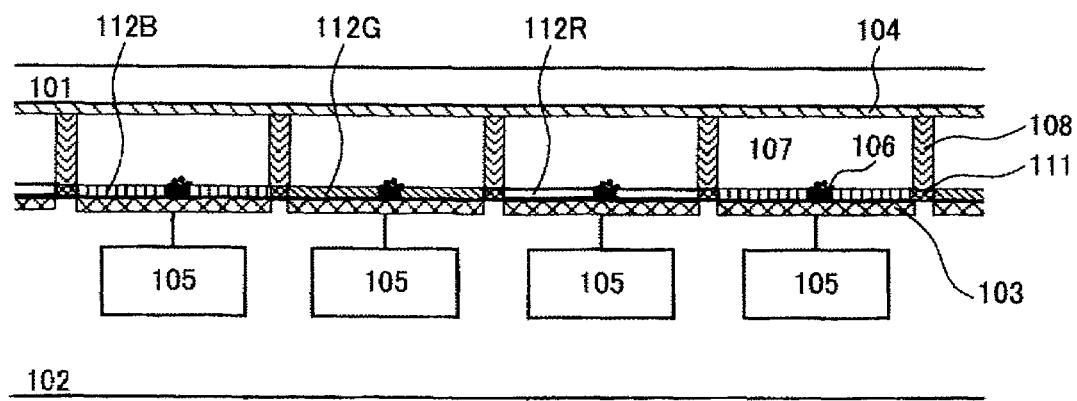

A cross-sectional structure of a display of the present embodiment is illustrated in FIG. 8B. After a pixel electrode 103 is deposited on a glass substrate 102, which is formed with particle driving means 105 that are disposed in a two dimensional array, by sputtering using a metal material having a high reflectivity such as Al, the pixel electrode 103 is patterned in a square shape through photolithography and wet etching. On the pixel electrode 103, an insulative color filter layer 112B which includes blue colorants dispersed in insulative resin and transmits only a blue wavelength region, an insulative color filter layer 112G which includes green colorants dispersed in the insulative resin and transmits only a green wavelength region, an insulative color filter layer 112R which includes dispersed red colorants and transmits only a red wavelength region, and a shielding layer 111 that has a absorptive property in the entire visible light wavelength region are pattern-formed. Furthermore, partitions that are comprised of cardo polymer and have a height of 5 μm are patterned in a lattice shape, and thus partitions 108 are formed. The part between the partitions 108 is filled with a transparent medium 107 that contains black charged particles 106 dispersed therein, and then sealed together with a substrate 101 that is formed with a counter electrode 104, which is an ITO transparent conductive filter. Thus the display is provided.

A top surface diagram of the display of the present embodiment is illustrated in FIG. 8A. In the present display, the image electrode 103 is formed in each sub-pixel of blue, green, and red which is two-dimensionally disposed at an interval of 150 μm×50 μm, each sub-pixel is partitioned by rectangular lattice shaped partitions 108, and insulative color filters 112R, 112G, and 112B, which are provided with openings 114, are formed on each pixel. On the insulative color filter layer 112, three square openings 114 are equidistantly disposed in each pixel. Therefore, even if the area of the pixel grows larger, response characteristics are provided that are equally excellent to that provided in the embodiment of FIGS. 1A and 1B.

This embodiment is capable of displaying colors with a high reflectivity and a high contrast as with case with the embodiment 1 of FIGS. 1A and 1B. Furthermore, since the substrate 101 is not pattern-formed, a high-definition display is effectively provided without the need to highly precisely align the substrate 101 with the substrate 102.

Embodiment 3

Next, another embodiment of the present display will be described more specifically with reference to FIGS. 6A, 6B, and 16.

Cross-sectional diagrams of the display of the present embodiment are illustrated in FIGS. 6A and 6B. A flexible substrate, which is coated with an insulating smoothing film made of resin, is formed on a metal thin plate, which is made of an FeNi42 alloy and has a thickness of 0.2 mm. On the flexible substrate, a particle driving means 105 is formed in a two-dimensional array as with the embodiment of FIGS. 1A, and then a pixel electrode 103, an insulating layer 110, and partitions 108 are formed. The part between the partitions 108 is filled with a transparent medium 107 that contains black charged particles 106 dispersed therein, and then sealed together with the flexible resin substrate having a thickness of 0.1 mm. Thus the display is provided.

Figure 16:
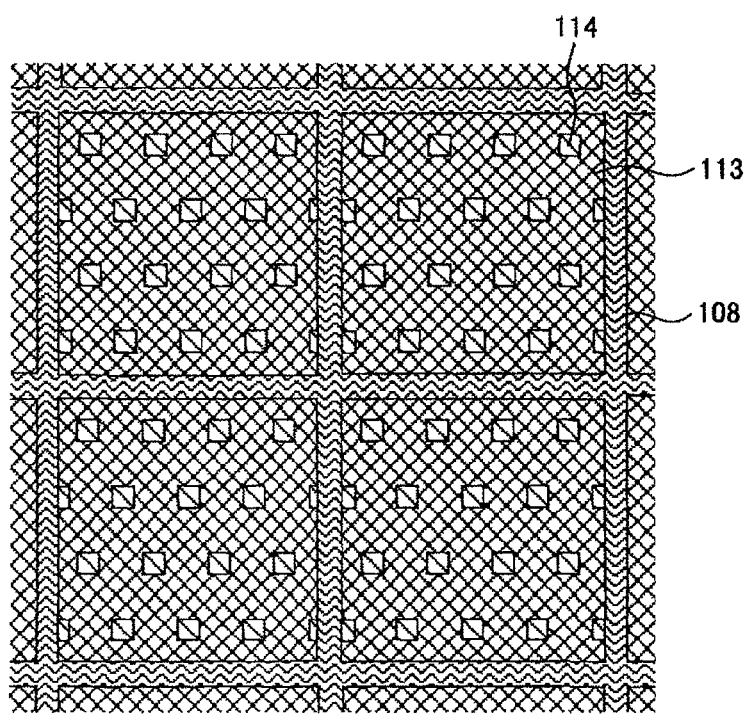
FIG. 16 is a diagram showing another embodiment of a planar structure of a display according to the present invention.

The display according to the present invention has a plurality of openings as illustrated in FIG. 16. The insulating layer openings are located in the center of square regions which are periodically disposed, and the square regions are disposed with a displacement of half a cycle for each row in one direction, as illustrated in FIG. 20. Therefore, it has become possible to shorten the longest particle moving distance, to substantially improve the response time, and to achieve excellent response characteristics even in a low voltage.

In addition, in the present display, since no pixel pattern is formed on the substrate 101, it is unnecessary to align the substrate 101 with the substrate 102 in a highly precise manner. Therefore, the use of a flexible substrate such as a thin glass, resin, and a thin metal is appropriate, and thus a display that is flexible and resistant to shock is provided. Similar effects are obtained in all structures illustrated in the present invention. The use of the flexible substrate enables the provision of a display that is flexible and resistant to shock.

Embodiment 4

Next, another embodiment of the display according to the present invention will de described along with a manufacturing method therefor with reference to FIGS. 4A and 4B.

Cross-sectional diagrams of the display of the present embodiment are illustrated in FIGS. 4A and 4B. A pixel electrode 103 is deposited on a glass substrate 102, on which particle driving means 105 is formed in a two-dimensional array, by sputtering using a metal material having a high reflectivity such as Al, and thereafter it is patterned in a square by photolithography and wet etching. In addition, after an insulating layer composed of $SiO_2$ is deposited by a plasma CVD method, openings are processed by photolithography and dry etching. After an electrode 123 as an auxiliary electrode is formed on the side of and near the insulating layer opening, partitions that comprise cardo polymer and have a thickness of 5 μm are patterned in a lattice shape to form partitions 108. The part between the partitions 108 is filled with an atmosphere, which is a transparent medium 107 that contains charged particles 106, as an electronic powder fluid, dispersed therein, and then sealed together with the substrate 101 that is formed with a counter electrode 104, which is an ITO transparent conductive film. Thus, the display is provided. The display of the present embodiment is capable of obtaining a high reflectivity as well as a high contrast similar to those obtained in the embodiments 1 to 3.

Embodiment 5

Figure 37:
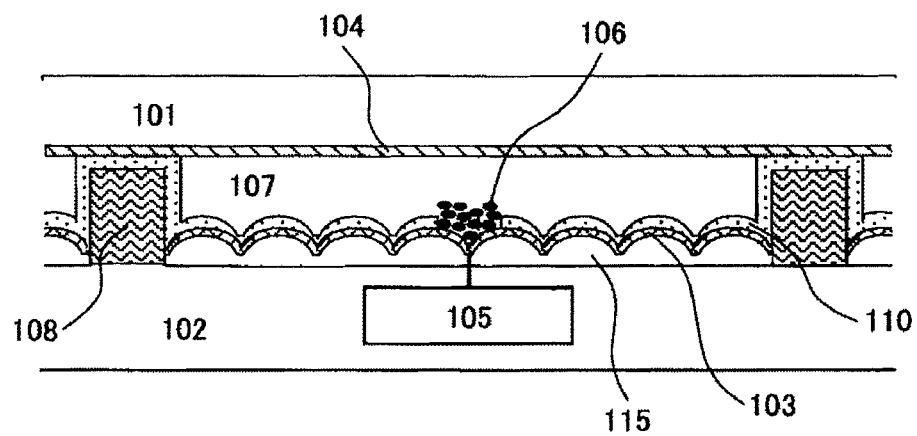
FIG. 37 is a diagram showing another embodiment of a cross-sectional structure of a display according to the present invention.

Another embodiment of the display according to the present invention will be described more specifically along with a manufacturing method therefor with reference to FIG. 37. FIG. 37 is a cross-sectional diagram of the display of the present embodiment.

An even layer 115 is formed on a glass substrate 102, which has a particle driving means 105 as a switching part that is formed in a two-dimensional array thereon, by photolithography and overheated melt. Then, an electrode 103A comprised of a metal material that is predominantly composed of Al, and a pixel electrode 103 that is comprised of ITO and has a thickness of 90 nm are formed by sputtering, photolithography, and etching. Then, partitions that are comprised of cardo polymer of an organic material and have a thickness of 5 μm are patterned in a lattice shape to form partitions 108. In addition, after an insulating layer 110 that is comprised of SiN and has a thickness of 50 nm is deposited by a CVD method, openings are processed by photolithography and dry etching. The part between the partitions 108 is filled with a transparent medium 107 that contains black charged particles 106 dispersed therein, and then sealed together with the substrate 101, which is formed with a counter electrode 104 of an ITO transparent conductive film. Thus, the display is provided.

The present display is provided with the ITO electrode. Therefore, in addition to the high reflectivity due to the metal material that is predominantly composed of Al, the interface state with the transparent medium is improved, and particles are converged and dispersed more smoothly, thus resulting in a high reflectivity as well as a high contrast. Moreover, since the partitions are formed of an organic material and coated with an inorganic insulating film, higher reliability is obtained.

Embodiment 6

Figure 38:
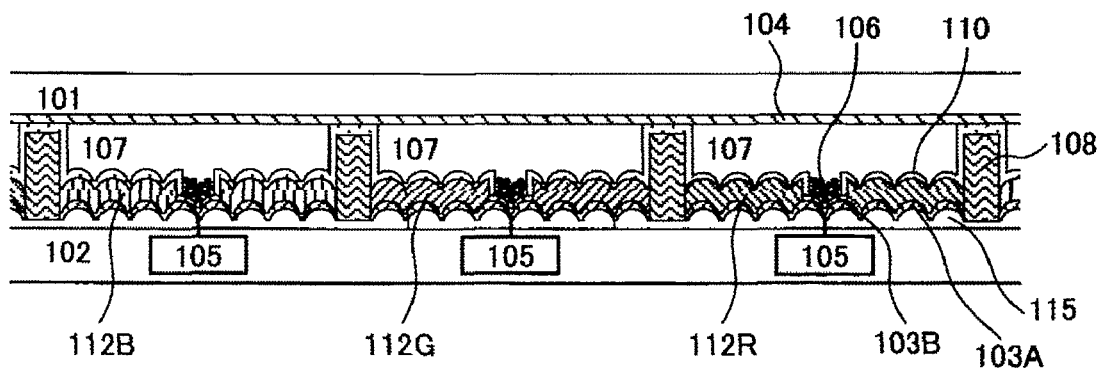
FIG. 38 is a diagram showing another embodiment of a cross-sectional structure of a display according to the present invention.

Next, another embodiment of the display according to the present invention will be described more specifically along with a manufacturing method therefor with reference to FIG. 38. FIG. 38 is a cross-sectional diagram of the present embodiment.

An uneven layer 115 is formed on a glass substrate 102, which has a particle driving means formed in a two-dimensional array thereon, by photolithography and overheated melt. Then, after a metal material that is predominantly composed of Al is deposited by sputtering, it is processed in a square pattern by photolithography and wet etching to form a first metal layer 103A. Next, after Cr is deposited by sputtering, it is etching-processed by photolithography while leaving only a region near insulating layer openings which will be formed later to form a second metal layer 103B. Then, the partitions that comprise cardo polymer of an organic material and have a height of 5 μm are patterned to form partitions 108. A blue color filter layer 112B, a green color filter layer 112G, and a red color filter layer 112R each having a thickness of 1 μm are formed on the first metal layer 103A. Furthermore, after an insulating layer 110 that comprises SiN and has a thickness of 140 nm is deposited by a plasma CVD method, openings are processed by photolithography and dry etching. The part between the partitions 108 is filled with a transparent medium 107 that contains black charged particles 106 dispersed therein, and then sealed together with the substrate 101, which is formed with the counter electrode 104 of an ITO transparent conductive layer. Thus, the display is provided.

The present display is capable of providing a colored presentation, since it is provided with color filters. The color filters also have openings with a depth of 1 μm, where particles are converged, thereby a high reflectivity being obtained. The present display is provided with a Cr electrode. Therefore, in addition to the high reflectivity provided due to the metal that is predominantly composed of Al, the interface state with the transparent medium is improved, particles are converged and dispersed more smoothly, thus a high reflectivity as well as a high contrast being obtained. Additionally, since the partitions are formed of an organic material and coated with an inorganic insulating film, higher reliability is obtained.

Embodiment 7

Next, another embodiment of the display according to the present invention will be described more specifically along with a manufacturing method therefor with reference to FIG. 33. FIG. 33 is a cross-sectional diagram of the display of the present embodiment.

FIG. 33 shows pixel electrodes structured in two layers as is the case with above described other embodiments. One layer is a first metal layer 103 formed across the entire pixel. The other layer is a second metal layer 103B disposed on a position on the first metal layer 103A that corresponds to the opening of an insulating layer 110.

The method of manufacturing the display will be described below.

A metal material that is composed predominantly of Al and has a thickness of 250 nm is deposited on a glass substrate 102, which has a particle driving means 105 that is formed thereon in a two-dimensional array, by sputtering. Then, it is processed in a square pattern by photolithography and wet etching to form a first metal layer 103A. Next, an ITO having a thickness of 140 nm is deposited by sputtering, and etching-processed by photolithography while leaving a region near an insulating layer opening which is formed later, to form a second metal layer 103B. Next, partitions that are comprised of cardo polymer of an organic material and have a thickness of 5 μm are patterned in a lattice shape between the first pixel electrodes 103A to form partitions 108. An insulating layer 110 that is comprised of SiN and has a thickness of 140 nm is further deposited on the first metal layer 103A by a plasma CVD method, and thereafter openings are processed by photolithography and dry etching. Then, the part between the partitions 108 is filled with a transparent medium 107 that contains black charged particles 106 dispersed therein, and thereafter sealed together with a substrate 101 that is formed with a counter electrode 104, which is an ITO transparent conductive film. Thus, the display is provided.

Since the ITO electrode is provided in the present display, in addition to the high reflectivity of the electrode provided due to the metal that is predominantly composed of Al, the interface state with the transparent medium is improved, particles are converged and dispersed more smoothly, and a high reflectivity as well as a high contrast are obtained.

Embodiment 8

Next, another embodiment of the display according to the present invention will be described more specifically along with a manufacturing method therefor with reference to FIG. 34. FIG. 34 is a cross-sectional diagram of the display of the present embodiment.

FIG. 34 shows a structure in which a second metal layer 103B corresponding to the second metal layer 103B described in FIG. 33 is formed in the same size as a first metal layer 103A to spread across a pixel.

The method manufacturing the display will be described below.

A metal material that is composed predominantly of Al and has a thickness of 250 nm, and an ITO having a thickness of 90 nm are deposited on a glass substrate 102, which has a particle driving means 105 that is formed in a two-dimensional array thereon, by sputtering, and then processed in a square pattern by photolithography and wet etching to form a first metal layer 103A and a second metal layer 103B. Next, partition layers that are comprised of cardo polymer of an organic material and have a thickness of 5 μm are patterned in a lattice shape to form partitions 108. An insulating layer 110 that is comprised of SiN and has a thickness of 50 nm is further deposited on the second metal layer 103B by a plasma CVD method, and thereafter openings are processed by photolithography and dry etching. The part between the partitions 108 is filled with a transparent medium 107 that contains black charged particles 106 dispersed therein, and then sealed, and then sealed together with a substrate 101 that is formed with a counter electrode 104, which is an ITO transparent conductive film. Thus, the display is provided.

In the present display, smooth particle convergence and dispersion, a high reflectivity, and a high contrast as with the embodiment 7 are achieved with a simple manufacturing process by collectively processing the pixel electrodes that comprise Al and ITO through photolithography and etching.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A display having a plurality of charged particles between a pair of substrates, the display comprising:
    one substrate of said pair of substrates that is formed with a pixel electrode;
    the other substrate of said pair of substrates that is disposed to face said one substrate and is formed with a counter electrode;
    a plurality of partitions for dividing the gap between said one substrate and said other substrate into a plurality of regions; and
    an insulating layer having an insulating part and an opening on said pixel electrode, wherein
    the display changes the potential difference applied between said pixel electrode and said counter electrode for displaying images.

2. The display according to claim 1, wherein said insulating layer selectively transmits a particular wavelength region of a visible region.

3. The display according to claim 1, wherein said opening formed in said insulating layer is formed in the center of said region.

4. The display according to claim 1, wherein a plurality of openings are formed in said region of said insulating layer.

5. The display according to claim 4, wherein said plurality of openings are formed in a periodic array.

6. The display according to claim 4, wherein the plane surface of each of said plurality of regions is a polygon.

7. The display according to claim 1, wherein the side of said insulating layer having said opening has an electrode.

8. The display according to claim 1, wherein said insulating layer is formed in an uneven shape.

9. The display according to claim 1, having an uneven layer formed on said other substrate and on the other side of the other substrate where said counter electrode is disposed.

10. The display according to claim 1, wherein transparent particles having a reflectivity different from that of said insulating layer are dispersed in said insulating layer.

11. The display according to claim 1, wherein said pixel electrode comprises a first metal layer and a second metal layer each formed of a different material, wherein
    said first metal layer is formed on the upper part of said substrate,
    said second metal layer is formed on said first metal layer, and disposed on a position corresponding to said opening, and
    the reflectivity of said first metal layer is higher than that of said second metal layer.

12. The display according to claim 11, wherein said second metal layer is formed of a transparent conductive material.

13. The display according to claim 11, wherein the electrode size of said first metal layer is substantially the same as that of said second metal layer.

14. The display according to claim 1, wherein said partitions and said insulating layer are formed of an organic material and coated with an inorganic insulating film comprised of an inorganic material.

15. The display according to claim 1, wherein said insulating layer having said insulating part and said opening is on a side of said pixel electrode which faces said counter electrode.

16. The display according to claim 1, wherein the display switches between a state where said plurality of charged particles are converged at said opening and a state where they are dispersed to said counter electrode and thereby displays images.

17. A display having a plurality of charged particles between a pair of substrates, the display comprising:
    one substrate of said pair of substrates that is formed with a pixel electrode;

the other substrate of said pair of substrates that is disposed to face said one substrate and is formed with a counter electrode;

a plurality of partitions for dividing the gap between said one substrate and said other substrate into a plurality of regions; and an insulating layer having an insulating part and an opening on said pixel electrode, wherein said opening of said insulating layer is smaller than said insulating part, and the display switches between a state where said plurality of charged particles are converged at said openings and a state where they are dispersed to said counter electrode and thereby displays images.

18. A display having a plurality of charged particles between a pair of substrates, the display comprising:

one substrate of said pair of substrates that is formed with a pixel electrode;

the other substrate of said pair of substrates that is disposed to face said one substrate and is formed with a counter electrode;

a plurality of partitions for dividing the gap between said one substrate and said other substrate into a plurality of regions; and an insulating layer having an insulating part and an opening on said pixel electrode, wherein said openings of said insulating layer are larger than said insulating part, and the display switches between a state where said plurality of charged particles are converged at the insulating part and a state where they are dispersed to said counter electrode, and thereby displays images.

19. The display according to any one of claim 1 to claim 18, wherein said pixel electrode and said counter electrode are formed throughout said region.

20. The display according to any one of claim 1 to claim 18, having an uneven layer that has an uneven shape formed in said region and on said counter electrode.

21. A display having a plurality of charged particles between a pair of substrates, the display comprising:

one substrate of said pair of substrates;

the other substrate of said pair of substrates that is disposed to face said one substrate and is formed with a counter electrode;

a plurality of partitions for dividing the gap between said one substrate and said other substrate into a plurality of regions;

an uneven layer having an uneven shape disposed on said one substrate;

a pixel electrode formed on said uneven layer; and an insulating layer having an insulating part and an opening on said pixel electrode, wherein the display changes the potential difference applied between said pixel electrode and said counter electrode, and thereby displays images.

22. The display according to claim 21, wherein said pixel electrode comprises a conductive material for reflecting visible light.

23. The display according to claim 21, wherein said partitions are formed of an organic material, and coated with an inorganic insulating film comprised of an inorganic material.

24. The display according to claim 21, having a color filter layer between said pixel electrode and said insulating layer.

25. The display according to claim 21, wherein said insulating layer having said insulating part and said opening is on a side of said pixel electrode which faces said counter electrode.

26. The display according to claim 21, wherein the display switches between a state where said plurality of charged particles are converged at said opening and a state where they are dispersed to said counter electrode and thereby displays images.

27. A display having a plurality of charged particles between a pair of substrates, the display comprising:

one substrate of said pair of substrates;

the other substrate of said pair of substrates that is disposed to face said one substrate and is formed with a counter electrode;

a plurality of partitions for dividing the gap between said one substrate and said other substrate into a plurality of regions;

an uneven layer having an uneven shape disposed on said one substrate;

a pixel electrode formed on said uneven layer; and an insulating layer having an insulating part and an opening on said pixel electrode, wherein the display switches between a state where said plurality of charged particles are converged at said opening and a state where they are dispersed to said counter electrode, and thereby displays images.

28. The display according to claim 21 or 27, wherein said pixel electrode and said counter electrode are formed throughout said region.

* * * * *